(12) United States Patent
Hodson et al.

(10) Patent No.: US 8,954,509 B1
(45) Date of Patent: Feb. 10, 2015

(54) SYSTEM AND METHOD FOR BROADCASTING DATA OVER A COMPUTER NETWORK

(75) Inventors: David Hodson, Palo Alto, CA (US); Royal P. Farros, Woodside, CA (US); Michael Rubin, San Francisco, CA (US); Ryan Bell, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 2652 days.

(21) Appl. No.: 10/666,767

(22) Filed: Sep. 18, 2003

(51) Int. Cl.
*G06F 15/16* (2006.01)

(52) U.S. Cl.
USPC .......................................................... 709/206

(58) Field of Classification Search
USPC .......................................................... 709/206
See application file for complete search history.

(56) References Cited

U.S. PATENT DOCUMENTS

| | | | | |
|---|---|---|---|---|
| 6,115,693 | A * | 9/2000 | McDonough et al. | 705/10 |
| 6,151,584 | A * | 11/2000 | Papierniak et al. | 705/10 |
| 6,868,544 | B2 * | 3/2005 | Dalal et al. | 719/318 |
| 6,944,662 | B2 * | 9/2005 | Devine et al. | 709/225 |
| 6,959,326 | B1 * | 10/2005 | Day et al. | 709/217 |
| 6,983,371 | B1 * | 1/2006 | Hurtado et al. | 713/189 |
| 7,103,905 | B2 * | 9/2006 | Novak | 725/46 |
| 7,213,005 | B2 * | 5/2007 | Mourad et al. | 705/64 |
| 7,277,870 | B2 * | 10/2007 | Mourad et al. | 705/51 |
| 7,349,980 | B1 * | 3/2008 | Darugar et al. | 709/238 |
| 7,496,637 | B2 * | 2/2009 | Han et al. | 709/217 |
| 7,925,777 | B2 * | 4/2011 | Levett | 709/238 |
| 7,958,515 | B2 * | 6/2011 | Tcherevik | 719/318 |
| 8,849,893 | B2 * | 9/2014 | Goodman et al. | 709/203 |
| 2002/0091771 | A1 * | 7/2002 | Agraharam et al. | 709/205 |
| 2002/0095399 | A1 * | 7/2002 | Devine et al. | 707/1 |
| 2004/0001087 | A1 * | 1/2004 | Warmus et al. | 345/745 |
| 2004/0019637 | A1 * | 1/2004 | Goodman et al. | 709/204 |
| 2006/0036679 | A1 * | 2/2006 | Goodman et al. | 709/203 |
| 2006/0080120 | A1 * | 4/2006 | Tcherevik | 705/1 |
| 2007/0038610 | A1 * | 2/2007 | Omoigui | 707/3 |
| 2008/0046803 | A1 * | 2/2008 | Beauchamp et al. | 715/212 |
| 2008/0294794 | A1 * | 11/2008 | Darugar et al. | 709/238 |

* cited by examiner

*Primary Examiner* — Douglas Blair
(74) *Attorney, Agent, or Firm* — Tom S Wong; Jim Ross; Micky Minhas

(57) ABSTRACT

A system and method for broadcasting data in the form of instant messages over a computer network. The broadcast system 100 preferably includes a messaging manager 200, an integration engine 300, a subscription manager 400, a scheduler 500, and a broadcast engine 600. The messaging manager 200 interfaces with all other components and provides a multi-threaded, run-time engine that coordinates the integration, triggering, scheduling, and message delivery activities for scalable broadcast applications. The integration engine 300 provides a system for "exposing" Web services and "consuming" external data streams. The subscription manager 400 includes an event watcher, which monitors the state of the external environment it interacts with, and an event dispatcher, which collects event subscriptions and ensures the instant delivery of events to all subscribers by way of the broadcast engine. The scheduler 500 allows users to customize the system 100 in order to schedule outgoing messages through the broadcast engine. The broadcast engine 600 enhances the inherent limitations of current IM technology by providing a multi-threaded broadcasting engine capable of sending volumes of messages from one server to literally thousands of IM clients concurrently over different private and public networks in one-to-one, one-to-many and many-to-many formats.

21 Claims, 28 Drawing Sheets

```xml
<?xml version="1.0" encoding="UTF-8" ?>
<wsdl:definitions targetNamespace="http://services.messagecast.net/axis/services/Message"
    xmlns="http://schemas.xmlsoap.org/wsdl/" xmlns:apachesoap="http://xml.apache.org/xml-
    soap" xmlns:impl="http://services.messagecast.net/axis/services/Message"
    xmlns:intf="http://services.messagecast.net/axis/services/Message"
    xmlns:soapenc="http://schemas.xmlsoap.org/soap/encoding/" xmlns:tns1="messagecast.net"
    xmlns:wsdl="http://schemas.xmlsoap.org/wsdl/"
    xmlns:wsdlsoap="http://schemas.xmlsoap.org/wsdl/soap/"
    xmlns:xsd="http://www.w3.org/2001/XMLSchema">
  <wsdl:types>
    <schema targetNamespace="messagecast.net"
        xmlns="http://www.w3.org/2001/XMLSchema">
      <import namespace="http://schemas.xmlsoap.org/soap/encoding/" />
      <complexType name="RecServicesContact">
        <sequence>
          <element name="from" nillable="true" type="xsd:string" />
          <element name="ord" type="xsd:int" />
          <element name="to" nillable="true" type="xsd:string" />
          <element name="transport" nillable="true" type="xsd:string" />
          <element name="transportID" type="xsd:int" />
          <element name="transportTypeID" type="xsd:int" />
        </sequence>
      </complexType>
      <complexType name="RecServicesMessage">
        <sequence>
          <element name="actionURL" nillable="true" type="xsd:string" />
          <element name="contacts" nillable="true"
            type="impl:ArrayOf_tns1_RecServicesContact" />
          <element name="content" nillable="true" type="xsd:string" />
          <element name="method" nillable="true" type="xsd:string" />
        </sequence>
      </complexType>
      <complexType name="RecServicesHeader">
        <sequence>
          <element name="messageID" nillable="true" type="xsd:string" />
          <element name="timestamp" nillable="true" type="xsd:string" />
          <element name="version" nillable="true" type="xsd:string" />
        </sequence>
      </complexType>
      <complexType name="RecServicesResponse">
        <sequence>
          <element name="SOAPRequest" nillable="true" type="xsd:string" />
          <element name="SOAPResponse" nillable="true" type="xsd:string" />
          <element name="statusCode" type="xsd:int" />
          <element name="statusReason" nillable="true" type="xsd:string" />
        </sequence>
      </complexType>
      <complexType name="RecServicesRequestResponse">
        <sequence>
          <element name="header" nillable="true" type="tns1:RecServicesHeader" />
          <element name="response" nillable="true" type="tns1:RecServicesResponse" />
        </sequence>
      </complexType>
      <complexType name="RecAlertsRequestResponse">
        <complexContent>
          <extension base="tns1:RecServicesRequestResponse">
```

FIGURE 7A

```
- <sequence>
    <element name="URL" nillable="true" type="xsd:string" />
  </sequence>
  </extension>
  </complexContent>
  </complexType>
- <complexType name="RecServicesGroupMessage">
  - <sequence>
      <element name="content" nillable="true" type="xsd:string" />
      <element name="fromContacts" nillable="true"
        type="impl:ArrayOf_tns1_RecServicesContact" />
      <element name="groupName" nillable="true" type="xsd:string" />
    </sequence>
  </complexType>
- <complexType name="RecServicesIdentification">
  - <sequence>
      <element name="PINID" type="xsd:int" />
      <element name="PW" nillable="true" type="xsd:string" />
    </sequence>
  </complexType>
  </schema>
- <schema targetNamespace="http://services.messagecast.net/axis/services/Message"
    xmlns="http://www.w3.org/2001/XMLSchema">
    <import namespace="http://schemas.xmlsoap.org/soap/encoding/" />
  - <complexType name="ArrayOf_tns1_RecServicesContact">
    - <complexContent>
      - <restriction base="soapenc:Array">
          <attribute ref="soapenc:arrayType"
            wsdl:arrayType="tns1:RecServicesContact[]" />
        </restriction>
      </complexContent>
    </complexType>
  </schema>
- <schema targetNamespace="http://xml.apache.org/xml-soap"
    xmlns="http://www.w3.org/2001/XMLSchema">
    <import namespace="http://schemas.xmlsoap.org/soap/encoding/" />
  - <complexType name="Map">
    - <sequence>
      - <element maxOccurs="unbounded" minOccurs="0" name="item">
        - <complexType>
          - <all>
              <element name="key" type="xsd:anyType" />
              <element name="value" type="xsd:anyType" />
            </all>
          </complexType>
        </element>
      </sequence>
    </complexType>
  </schema>
  </wsdl:types>
- <wsdl:message name="InitiateRequest">
    <wsdl:part name="in0" type="xsd:string" />
    <wsdl:part name="in1" type="xsd:string" />
    <wsdl:part name="in2" type="xsd:string" />
    <wsdl:part name="in3" type="xsd:int" />
    <wsdl:part name="in4" type="xsd:string" />
```

FIGURE 7B

```xml
    </wsdl:message>
  - <wsdl:message name="InitiateResponse">
      <wsdl:part name="InitiateReturn" type="apachesoap:Map" />
    </wsdl:message>
  - <wsdl:message name="GroupDeliverResponse">
      <wsdl:part name="GroupDeliverReturn" type="tns1:RecServicesRequestResponse" />
    </wsdl:message>
  - <wsdl:message name="InitiateRequest1">
      <wsdl:part name="in0" type="tns1:RecServicesHeader" />
      <wsdl:part name="in1" type="tns1:RecServicesIdentification" />
    </wsdl:message>
  - <wsdl:message name="GroupDeliverRequest">
      <wsdl:part name="in0" type="tns1:RecServicesHeader" />
      <wsdl:part name="in1" type="tns1:RecServicesIdentification" />
      <wsdl:part name="in2" type="tns1:RecServicesGroupMessage" />
    </wsdl:message>
  - <wsdl:message name="InitiateResponse1">
      <wsdl:part name="InitiateReturn" type="tns1:RecServicesRequestResponse" />
    </wsdl:message>
  - <wsdl:message name="DeliverResponse">
      <wsdl:part name="DeliverReturn" type="tns1:RecServicesRequestResponse" />
    </wsdl:message>
  - <wsdl:message name="DeliverRequest">
      <wsdl:part name="in0" type="tns1:RecServicesHeader" />
      <wsdl:part name="in1" type="tns1:RecServicesIdentification" />
      <wsdl:part name="in2" type="tns1:RecServicesMessage" />
    </wsdl:message>
  - <wsdl:portType name="MessageWebServices">
    - <wsdl:operation name="Deliver" parameterOrder="in0 in1 in2">
        <wsdl:input message="impl:DeliverRequest" name="DeliverRequest" />
        <wsdl:output message="impl:DeliverResponse" name="DeliverResponse" />
      </wsdl:operation>
    - <wsdl:operation name="GroupDeliver" parameterOrder="in0 in1 in2">
        <wsdl:input message="impl:GroupDeliverRequest" name="GroupDeliverRequest" />
        <wsdl:output message="impl:GroupDeliverResponse"
          name="GroupDeliverResponse" />
      </wsdl:operation>
    - <wsdl:operation name="Initiate" parameterOrder="in0 in1 in2 in3 in4">
        <wsdl:input message="impl:InitiateRequest" name="InitiateRequest" />
        <wsdl:output message="impl:InitiateResponse" name="InitiateResponse" />
      </wsdl:operation>
    - <wsdl:operation name="Initiate" parameterOrder="in0 in1">
        <wsdl:input message="impl:InitiateRequest1" name="InitiateRequest1" />
        <wsdl:output message="impl:InitiateResponse1" name="InitiateResponse1" />
      </wsdl:operation>
    </wsdl:portType>
  - <wsdl:binding name="MessageSoapBinding" type="impl:MessageWebServices">
      <wsdlsoap:binding style="rpc" transport="http://schemas.xmlsoap.org/soap/http" />
    - <wsdl:operation name="Deliver">
        <wsdlsoap:operation soapAction="" />
      - <wsdl:input name="DeliverRequest">
          <wsdlsoap:body encodingStyle="http://schemas.xmls ap.org/soap/encoding/"
            namespace="http://services.messagecast.net/axis/services/Message"
            use="enc ded" />
        </wsdl:input>
      - <wsdl:output name="DeliverResp nse">
```

FIGURE 7C

```xml
            <wsdlsoap:body encodingStyle="http://schemas.xmlsoap.org/soap/encoding/"
                namespace="http://services.messagecast.net/axis/services/Message"
                use="encoded" />
        </wsdl:output>
    </wsdl:operation>
 - <wsdl:operation name="GroupDeliver">
        <wsdlsoap:operation soapAction="" />
     - <wsdl:input name="GroupDeliverRequest">
            <wsdlsoap:body encodingStyle="http://schemas.xmlsoap.org/soap/encoding/"
                namespace="http://services.messagecast.net/axis/services/Message"
                use="encoded" />
        </wsdl:input>
     - <wsdl:output name="GroupDeliverResponse">
            <wsdlsoap:body encodingStyle="http://schemas.xmlsoap.org/soap/encoding/"
                namespace="http://services.messagecast.net/axis/services/Message"
                use="encoded" />
        </wsdl:output>
    </wsdl:operation>
 - <wsdl:operation name="Initiate">
        <wsdlsoap:operation soapAction="" />
     - <wsdl:input name="InitiateRequest">
            <wsdlsoap:body encodingStyle="http://schemas.xmlsoap.org/soap/encoding/"
                namespace="http://services.messagecast.net/axis/services/Message"
                use="encoded" />
        </wsdl:input>
     - <wsdl:output name="InitiateResponse">
            <wsdlsoap:body encodingStyle="http://schemas.xmlsoap.org/soap/encoding/"
                namespace="http://services.messagecast.net/axis/services/Message"
                use="encoded" />
        </wsdl:output>
    </wsdl:operation>
 - <wsdl:operation name="Initiate">
        <wsdlsoap:operation soapAction="" />
     - <wsdl:input name="InitiateRequest1">
            <wsdlsoap:body encodingStyle="http://schemas.xmlsoap.org/soap/encoding/"
                namespace="http://services.messagecast.net/axis/services/Message"
                use="encoded" />
        </wsdl:input>
     - <wsdl:output name="InitiateResponse1">
            <wsdlsoap:body encodingStyle="http://schemas.xmlsoap.org/soap/encoding/"
                namespace="http://services.messagecast.net/axis/services/Message"
                use="encoded" />
        </wsdl:output>
    </wsdl:operation>
 </wsdl:binding>
 - <wsdl:service name="MessageWebServicesService">
  - <wsdl:port binding="impl:MessageSoapBinding" name="Message">
        <wsdlsoap:address
            location="http://services.messagecast.net/axis/services/Message" />
    </wsdl:port>
 </wsdl:service>
</wsdl:definitions>
```

FIGURE 7D

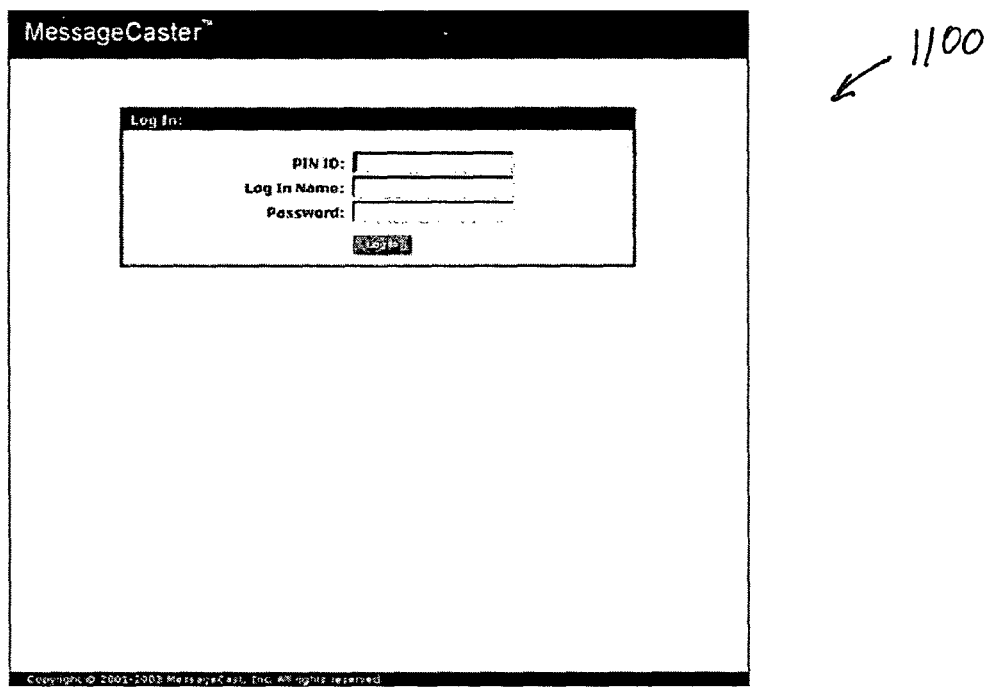
FIGURE 8 - Login Screen

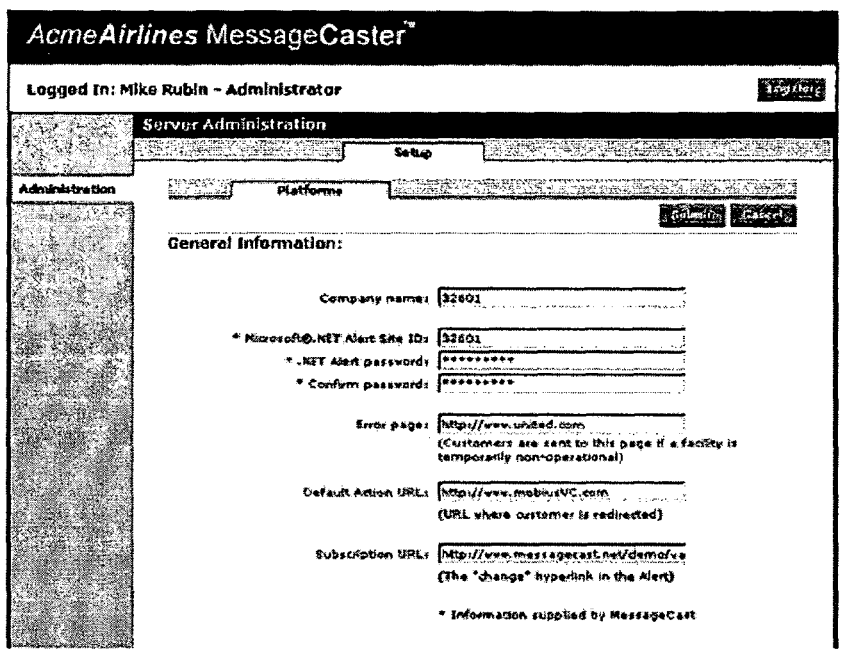
FIGURE 9 - Setup Screen

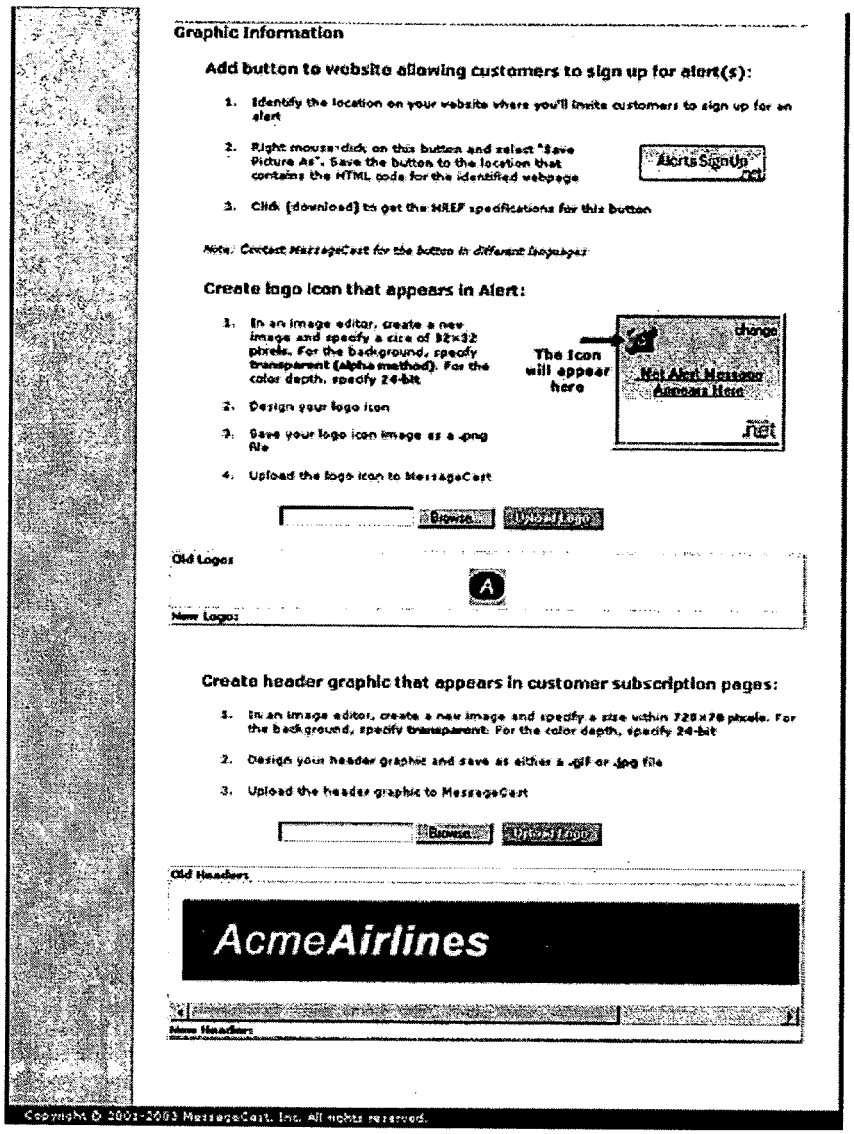
FIGURE 10 - Graphics Upload Screen

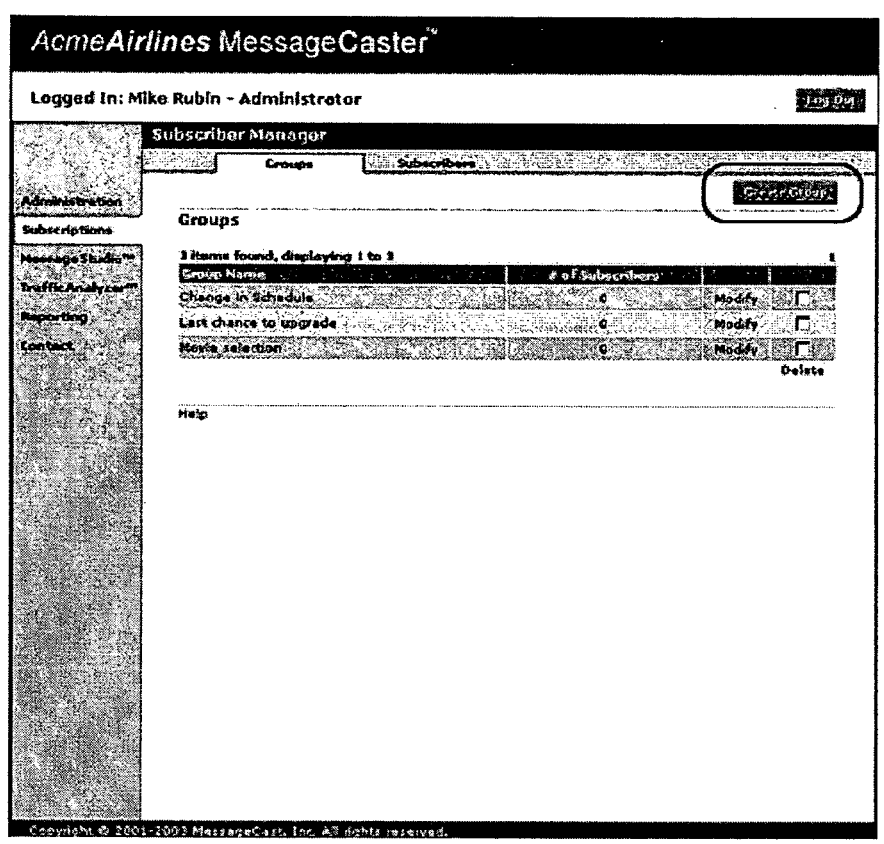
FIGURE 11 - Creating Subscription Groups

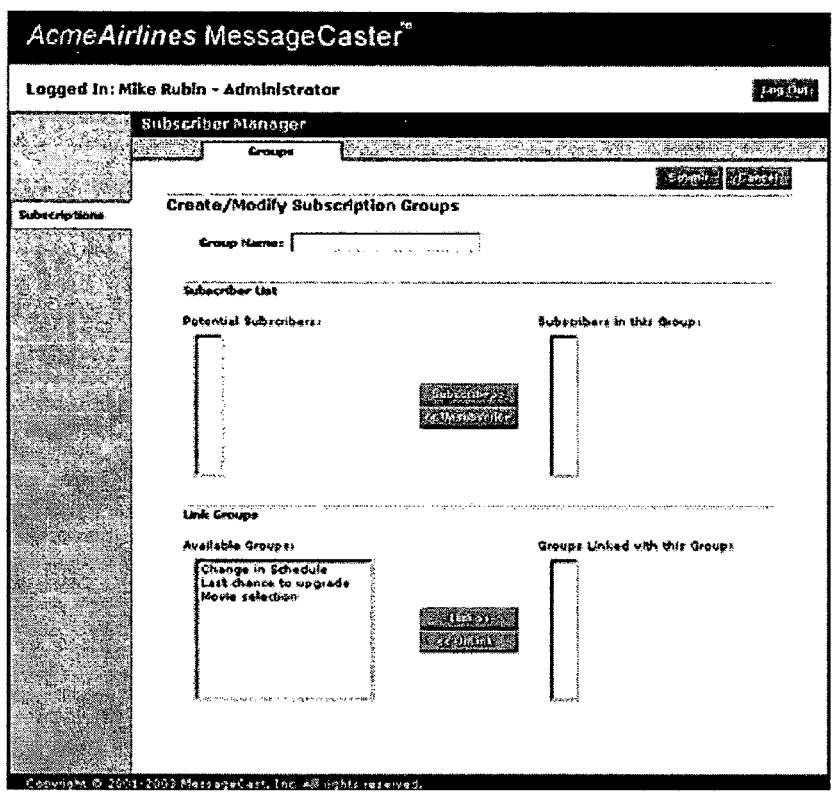
FIGURE 12 - Groups

FIGURE 13 - Marketing/Signup Screen

FIGURE 14 - Alert Selection Screen

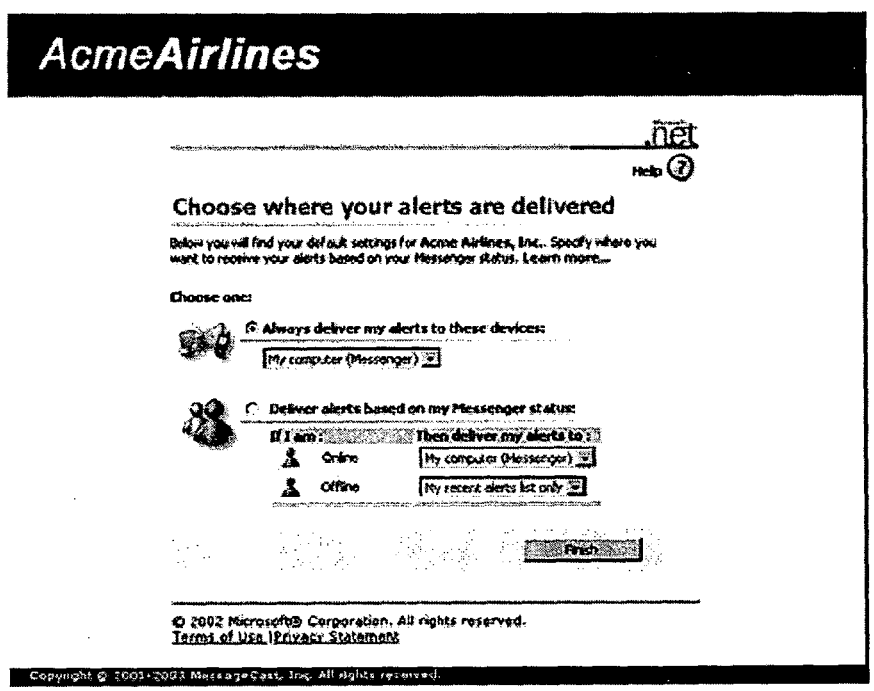
FIGURE 15 - Device Selection Screen for Alerts

FIGURE 16 - Selected Alerts are displayed

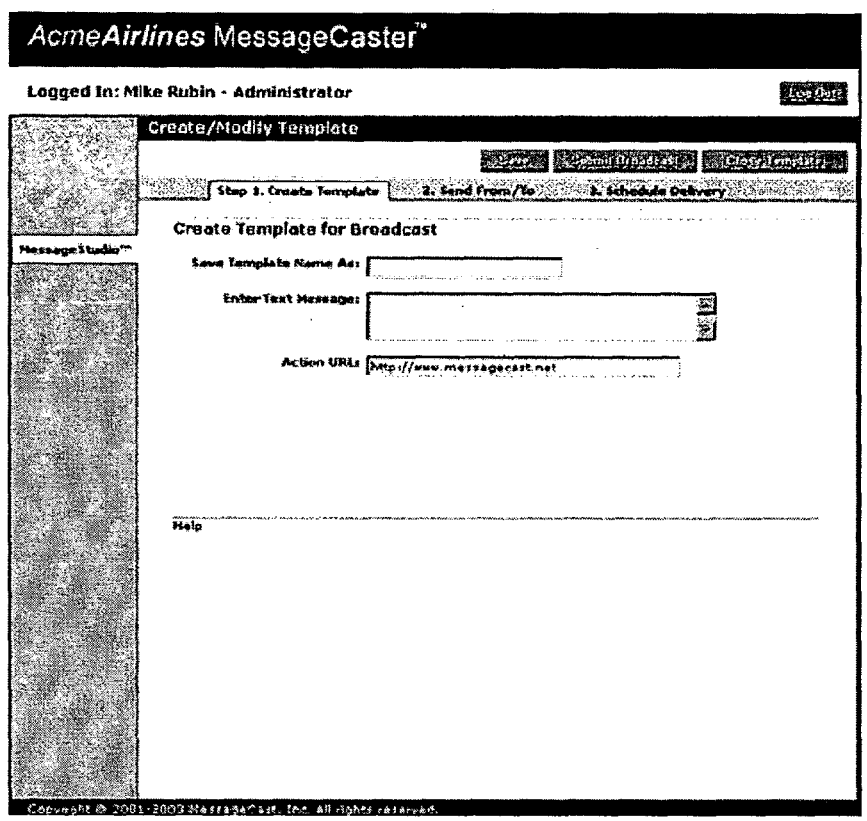
FIGURE 17 - Creating Editorial Alerts, pt. 1

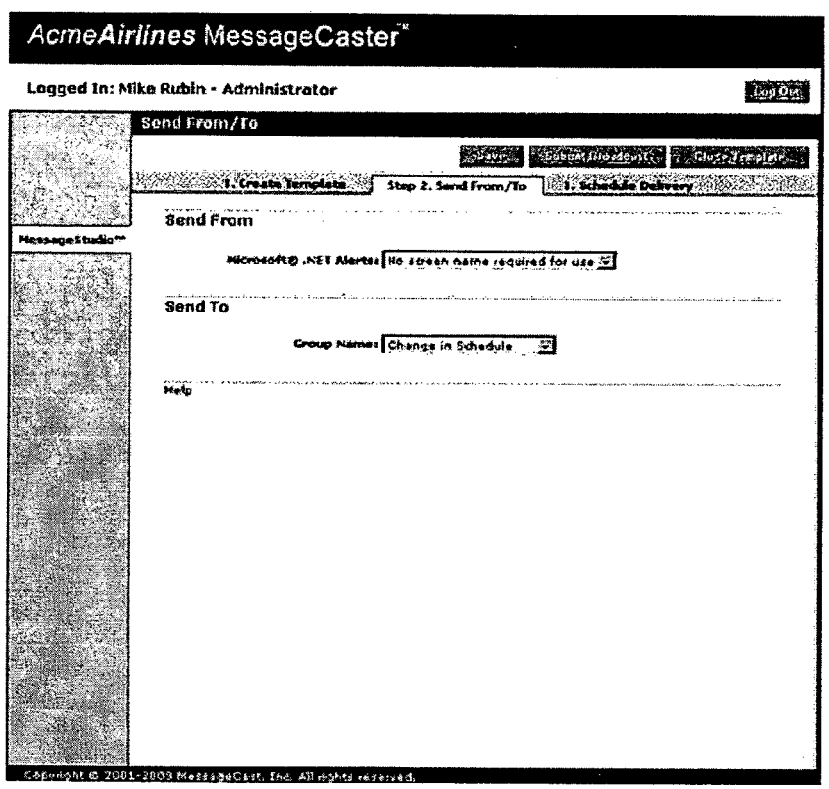
FIGURE 18 - Creating Editorial Alerts, pt. 2

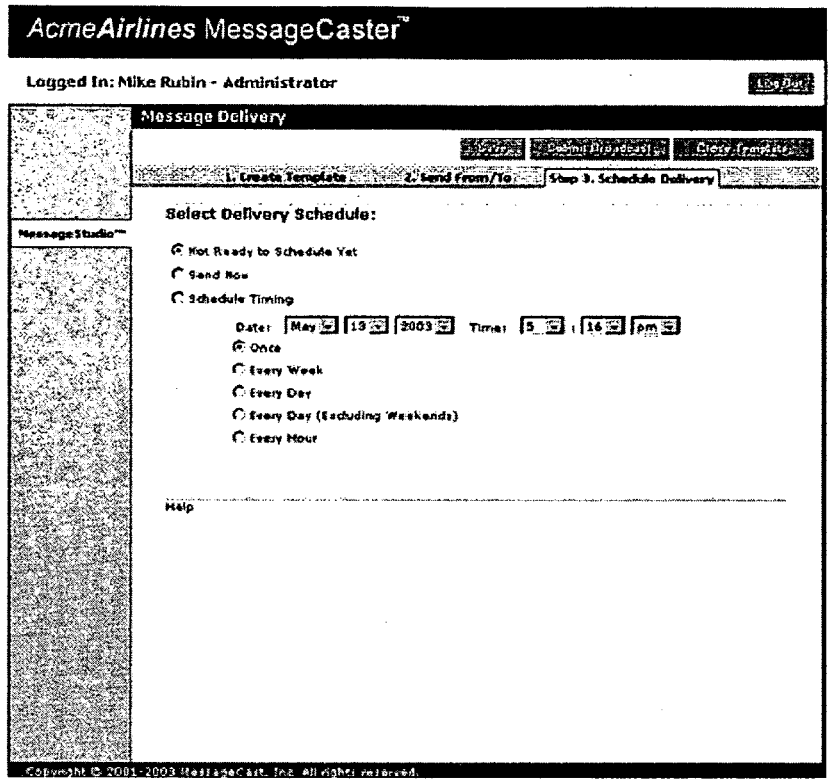
FIGURE 19 - Creating Editorial Alerts, pt. 3
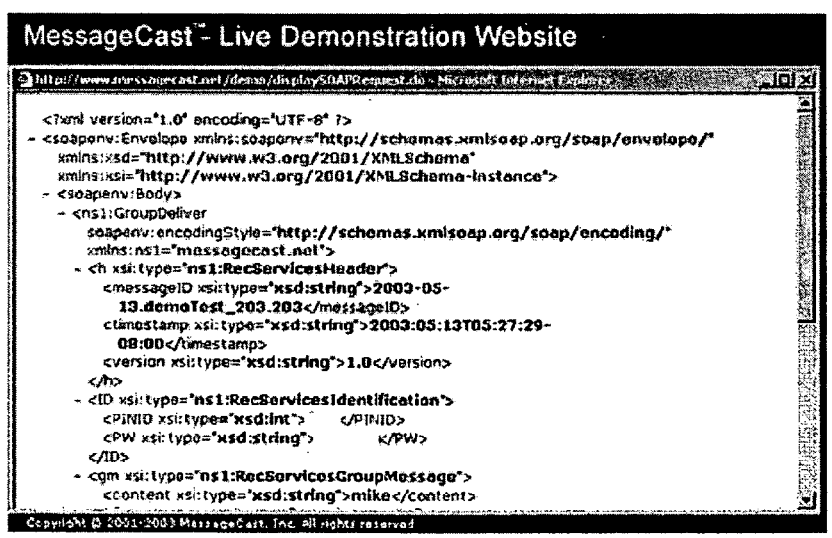
FIGURE 20 - SOAP Message for triggering alert

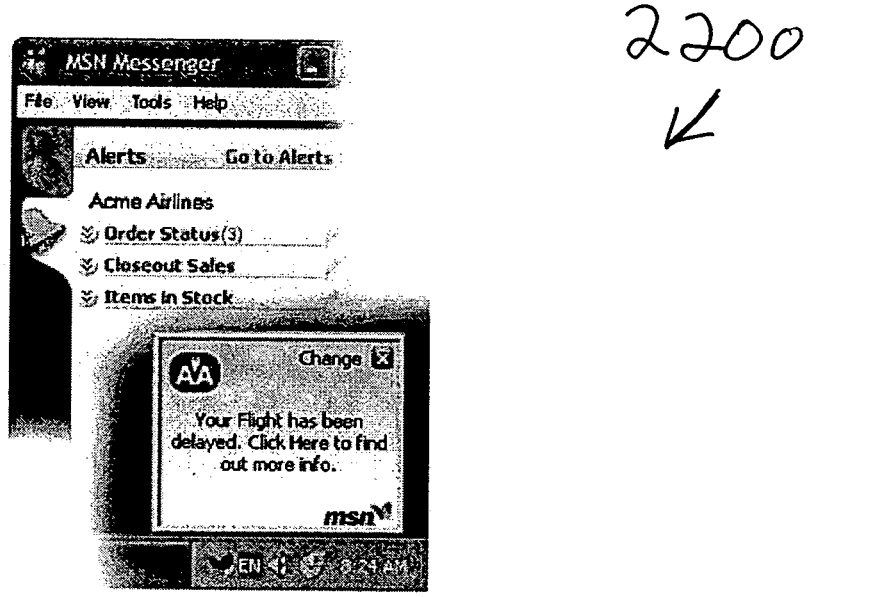
FIGURE 21 - Alert Example

Step 3

Step 4

Step 3

Step 4

Net Alerts Initial signup

SYSTEM AND METHOD FOR BROADCASTING DATA OVER A COMPUTER NETWORK

FIELD OF THE INVENTION

The present invention generally relates to a system and method for broadcasting data over a computer network and more particularly, to an improved system and method that enables data in the form of instant messages to be broadcast over a computer network in a highly scalable, tightly integrated, transactional environment.

BACKGROUND OF THE INVENTION

Instant Messaging (sometimes called IM or IMing) allows a user to easily see whether chosen friends, associates or co-workers are connected to the Internet (and whether they are willing to accept messages) and, if they are, to exchange messages with them. Instant messaging differs from ordinary e-mail in the immediacy of the message exchange and also makes a continued exchange simpler than sending e-mail back and forth. Allowing each user to know whether another user is present and willing to accept messages makes IM communication feel immediate and more personal.

IM was built as a simple "one-to-one" communication mechanism. That is, one user will broadcast messages to another single user. IM is a data communication and may incorporate, text, voice, and virtually any other media types. IM is also considered an active form of messaging, meaning it can relay—and act upon—information as to one's availability and whereabouts without one's intervention.

Like the personal computer, the applications for IM are virtually endless. However, current IM technology is relatively primitive and limited in its applications, especially in the enterprise context. For IM to grow in the enterprise, it must transition from a simple one-to-one communication mechanism into an automated, accessible, extensible, and scalable one-to-many platform—able to bring its unique communication characteristics to a massively larger audience in a programmatic and automated fashion—and able to integrate with past, current, and future standards. The present invention provides an automated system and method for broadcast IM that serves these goals.

SUMMARY OF THE INVENTION

The present invention provides a system and method for broadcasting data in the form of instant messages over a computer network. The broadcast system preferably includes a messaging manager, an integration engine, a subscription manager, a scheduler, and a broadcast engine. The messaging manager interfaces with all other components and provides a multi-threaded, run-time engine that coordinates the integration, triggering, scheduling, and message delivery activities for scalable broadcast applications. The integration engine provides a system for "exposing" Web services and "consuming" external data streams. The subscription manager functions in a "publish and subscribe" framework and contains a set of autonomous components, including an event watcher, which monitors the state of the external environment it interacts with, and an event dispatcher, which collects event subscriptions and ensures the instant delivery of events to all subscribers by way of the broadcast engine. The scheduler is a rules-based application, which allows users to customize the system according to their specifications. The system uses those rules or specifications to schedule outgoing messages through the broadcast engine. The broadcast engine enhances the inherent limitations of current IM technology by providing a multi-threaded broadcasting engine capable of sending volumes of messages from one server to literally thousands of IM clients concurrently over different private and public networks in one-to-one, one-to-many and many-to-many formats.

Some non-limiting advantages that would be provided to an enterprise by the system and method of the present invention are shown in the table below:

| Bottom line | Impact to Enterprise |
| --- | --- |
| IM is up to 5 times more effective than email | Productivity gains |
| Out-of-the box connectivity to Enterprise IM (EIM)/Alert solutions and IM (e.g., AOL, Yahoo) | Ease of integration |
| Flexibility to work with existing websites, internal databases, and operating systems | Ease of integration |
| LDAP/Active Directory support | Ease of setup |
| Non-programmer resources can create, schedule, and maintain IM broadcasts | Operational cost saving; Productivity |
| The "Point-and-Consume" feature allows for easy Web services consumption/integration | Eliminates need to write data triggers |
| Transactional-based infrastructure allows for viewing, tabulating, archiving, tracking, and metering critical operating statistics | Ease of administration; Ease of internal cost accounting; Metering provides source of revenue |
| Support the major IM/EIM platforms through single system integration | Implementation savings; Maintenance savings; Reach wider audience |

According to one aspect of the invention, a system for broadcasting data over one or more computer networks is disclosed. The system includes a broadcast module that is adapted to concurrently broadcast data to a plurality of users over one or more computer networks; an integration module that is adapted to expose and consume Web services relating to a publication; a scheduling module that is adapted to allow a user to define a schedule for retrieving data relating to a publication from a Web service, and to cause the integration engine to retrieve the data according to the defined schedule; and a subscription module that is adapted to receive and store subscriptions to the publication, and to selectively cause the broadcast module to broadcast data to a group of users that are subscribed to the publication.

According to a second aspect of the invention, a method is provided for broadcasting data over a computer network. The method includes the steps of: providing an interface for an author to create a publication; providing an interface for an author to add subscribers to the publication and/or for users to selectively subscribe to and unsubscribe from the publication; consuming at least one Web service to receive a data stream relating to the publication according to a predetermined schedule; and concurrently broadcasting data to a plurality of users subscribed to the publication based on the received data stream.

These and other features and advantages of the invention will become apparent by reference to the following specification and by reference to the following drawings.

BRIEF DESCRIPTION OF THE DRAWINGS

FIGS. 7A-D illustrate one non-limiting embodiment of a WSDL document that can be used by the system to define some of the available Web services.

FIG. 8 illustrates an example of a login screen that may be generated by the system to allow users to log into the system.

FIG. 9 illustrates an example of an initial set up screen.

FIG. 10 illustrates an example of a setup screen for uploading graphics.

FIGS. 11 and 12 illustrate two screens for creating subscription groups.

FIG. 13 is an example of a subscription signup screen that must be completed before a customer can receive informational alerts.

FIG. 14 is an example of a screen that allows users to select a category of alerts they would like to receive by way of a pull-down menu.

FIG. 15 is an example of a screen that allows a user to select a device to which the alerts will be sent.

FIG. 16 is an example of a screen displaying the alerts that have been selected by the customer.

FIGS. 17-19 are examples of screens used to create and send editorial alerts.

FIG. 20 is an example of a SOAP message that can be used to send triggered alerts.

FIG. 21 is an example of an alert that may be sent by system.

DETAILED DESCRIPTION OF A PREFERRED EMBODIMENT OF THE INVENTION

The present invention will now be described in detail with reference to the drawings, which are provided as illustrative examples of the invention so as to enable those skilled in the art to practice the invention. The present invention provides a system and method for broadcasting data over a computer network. In the preferred embodiment, the system and method are implemented on one or more computer systems or severs and are designed to broadcast data in the form of Instant Messages (IMs). As used herein, the terms Instant Messaging, Instant Messages, and IM should be understood to mean electronic messaging systems and related messages that allow a user determine whether chosen recipients are connected to the Internet (and whether they are willing to accept messages) and, if they are, to exchange messages with them in real time. While the following discussion includes a description of the present invention being used for the broadcast of IMs, it should be appreciated that the present invention may be utilized to broadcast other types of electronic data or messages.

The implementation of certain elements of the present invention may be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

I. General Architecture

Figure 1:
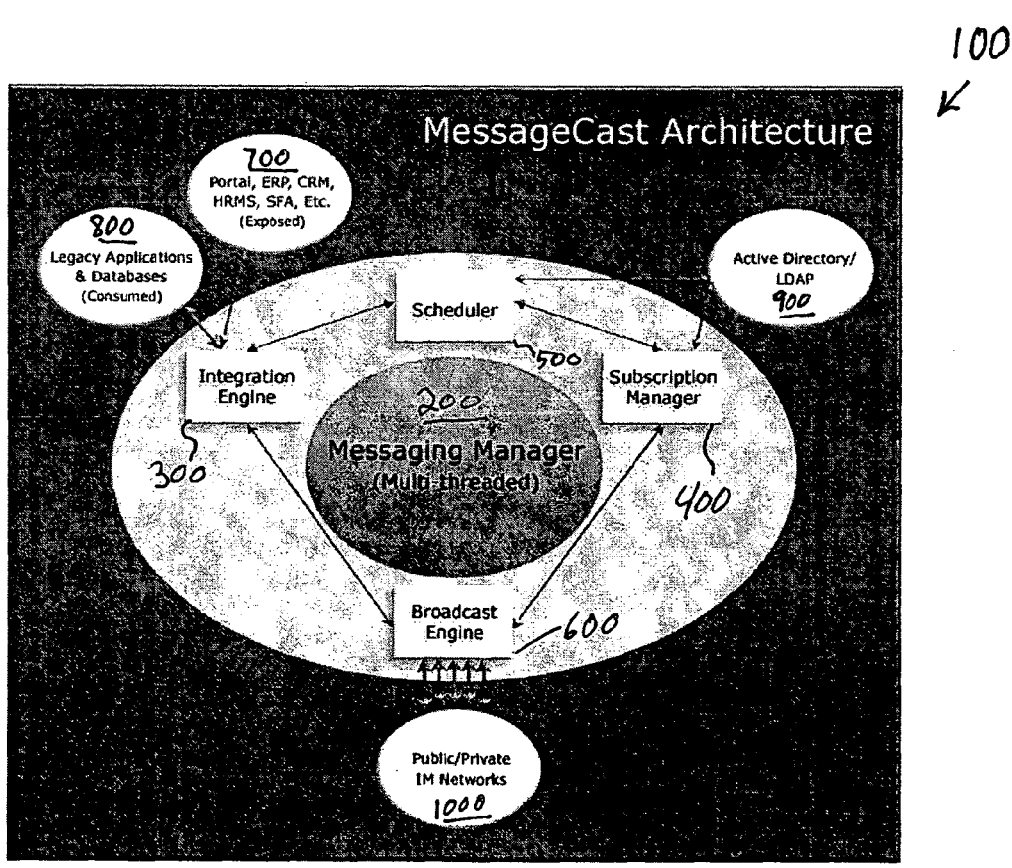
FIG. 1 is a block diagram of a system for broadcasting data over a computer network, according to the present invention.

FIG. 1 shows a data broadcasting system 100 according to the present invention. The system 100 may include software components implemented on one or more a conventional and commercially available computer systems or servers, or on an independent microprocessor-based system built specifically for use with the present invention. Although not depicted in FIG. 1, the system 100 should be understood to include conventional input, output and communication devices for receiving and transmitting data into and from the system, and one or more conventional storage devices for storing data within the system.

The system 100 is designed on a platform that provides a highly scalable, tightly integrated, transactional environment. In the preferred embodiment, the data broadcasting system 100 includes five modules: 1) a messaging manager 200; 2) an integration engine 300; 3) a subscription manager 400; 4) a scheduler 500; and 5) a broadcast engine 600. The operation of each of these modules will be described in detail in the following discussion. While the present embodiment includes five separate modules, it should be appreciated that the functionality of any one or more of these modules could be consolidated with other modules and/or provided by external systems.

1. Messaging Manager

In the preferred embodiment, the Messaging manager 200 communicates and interfaces with all other components or modules of system 100. Messaging manager 200 provides a multi-threaded, run-time engine that coordinates the integration, triggering, scheduling, and message delivery activities for scalable broadcast applications. The messaging manager 200 can handle requests for thousands of simultaneous users, while at the same time managing interactions with multiple data sources, including legacy applications and databases, through a variety of integration methods.

The messaging manager 200 interacts with the other components of system 100 to coordinate requests with message schedules, pull appropriate user information from external data sources such as LDAP (Lightweight Directory Access Protocol) and Active Directory stores, and broadcast literally thousands of messages simultaneously through any number of proprietary private and public IM networks. The operational flow of the messaging manager 200 and its interaction with the other components of the system are discussed below in greater detail relative to FIGS. 22, 23A-D and 24A-D.

In the preferred embodiment, the messaging manager 200 uses object-oriented technology to spawn multiple threads within a session and therefore can support large numbers of simultaneous users. By utilizing efficient thread management, the system 100 can access external data sources through Web service interfaces while concurrently broadcasting messages over public/proprietary networks.

Each component works in a 1 to 'n' framework. As a result, multiple servers can be added to the cluster, enabling the messaging manager 200 to scale to millions of sessions and threads distributed throughout a server farm.

The messaging manager 200 also provides the objects and methods that allow the broadcast system 100 to set up and manage a central policy database, link those policies to specific roles, distribute the policies to the appropriate applications, and audit all system activity.

The messaging manager 200 may include and/or be communicatively coupled to a relational database (not shown), which stores all data for the system 100. The messaging manager 200 preferably uses state of the art Object/Relational mapping tools for object management/persistence. The messaging manager 200 may also include a cache memory unit (not shown) for storing business rules in real time, thereby allowing business rules to be readily and immediately available and simplifying distribution of business rules. The cache can be continuously updated "on-the-fly" (e.g., in real-time).

2. Integration Engine

The integration engine 300 may be communicatively coupled to the scheduler 500, the broadcast engine 600, Web services 700 and external data streams 800, as shown in FIG. 1. The integration engine 300 provides a method for "exposing" Web services 700 (e.g., hosting and making available the Web services so that they can be used by other applications or services, such as by way of APIs) and "consuming" external data streams 800 (e.g., accessing and executing the application logic, such as by use of the system's "Point and Consume" feature). As discussed below, the integration engine 300 provides at least two primary benefits: (1) it allows existing triggers to be easily integrated, and (2) it allows accessing and monitoring a diverse set of backend applications and databases in a cost-effective manner.

With enhanced integration capabilities and an open architecture, system 100 is able to provide enterprises with a robust platform for integration utilizing a variety of Web services, including WSDL, HTTP POST/GET, SOAP-RPC, and SOAP document styles, as well as providing for appropriate local services. Because this area is constantly evolving (i.e., new Web service standards are created on a regular basis), system 100 is extensible and able to interact with evolving standards.

a) Web Service Integration

Figure 2:
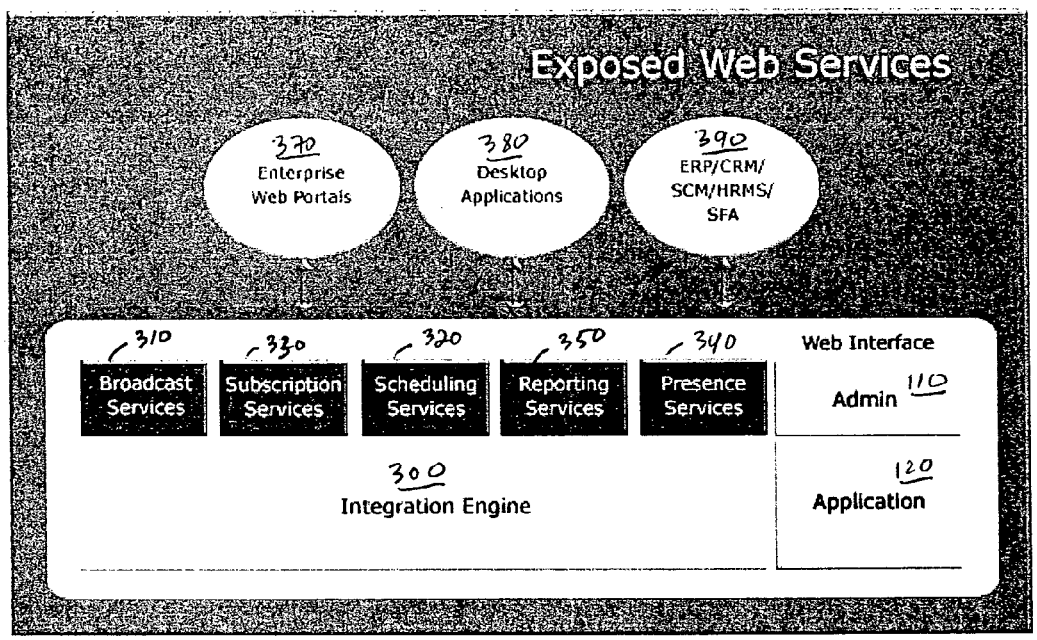
FIG. 2 is a block diagram depicting the integration engine with various exposed Web services.

In the preferred embodiment, system 100 contains a robust set of Web service API's that allows for remote event triggering. FIG. 2 illustrates the integration engine 300 and various exposed Web services (e.g., to enterprise Web portals 370, desktop applications 380, and enterprise applications 390). The system 100 provides functionality by way of an "Admin" level set of privileges 110 that allows for the provisioning and integration of the exposed Web services (for example, the password and originating IP address range of a Web service request). It also provides an "Application" level set of privileges 120 that enable an authenticated user to utilize tool sets to help/support the consumption of the exposed Web services (for example, diagnostic information regarding Web service requests, integration testing tools, and the like). As shown, the integration engine 300 exposes extensive functionalities through the Broadcast, Scheduling, Subscription and Presence services:

Broadcast Services 310: These services provide for message delivery (individual or group(s)), status, and history.

Scheduling Services 320: These services provide for creation and management of scheduled notifications (trigger, presence, one-time/recurring and subscription-based).

Subscription Services 330: These services provide for group and user management (creation, modification, deletion).

Presence Services 340: These services provide for user availability, including MPOP (multiple points of presence) by endpoint.

Reporting Services 350: These services provide information regarding all manner of transactional and system data, including utilization and click-through tracking.

An example of service utilization would be as follows. An external application can be used to monitor the Associated Press newswire for important news. The application can include codified logic that is compared against the newswire data stream and when a pre-determined set of rules are met, the application calls the Broadcast services for delivery to all subscribers of the "Breaking News" publication. In one embodiment, the application achieves this by creating a SOAP packet that contains an XML payload meeting the system specifications. The SOAP packet is delivered via HTTP/HTTPS to the system servers. The system servers then attempt to validate the inbound request, examining items such as originating IP address, PINID, password and other message elements. A SOAP packet with a specified response payload is then created and returned to the requesting application. Data in the response signifies if the request was validated successfully, and if not, lists the specific reasons for rejection.

If the request is validated successfully, it is processed and delivered to the messaging manager 200. The messaging manager 200 then follows logic similar to that described in FIG. 24D. A list of publication subscribers is retrieved (e.g., block 3102); the content is created (e.g., block 3104) and then broadcast to the subscriber base (e.g., block 3106). The Broadcast, Scheduling, Subscription, Presence and Reporting services function similarly.

b) Point & Consume Integration

The message broadcasting system 100 includes a "point and consume" integration feature, which uniquely implements open Web service standards, providing users with an easy-to-use web-based interface for interacting with Web services inside and outside the enterprise firewall.

Functioning like a proxy to the Web service, the point and consume feature hides all of the programming nuances of setting up and working with UDDI (Universal Description, Discovery Language), XML (eXtensible Markup Language) and Description Languages, providing the user with a remarkably easy way to subscribe to business services. The interface seeks out the Web service design, providing the user with a simple method of building triggers into legacy applications and databases.

Making an exposed Web service available for consumption and utilizing/consuming the Web service may be accomplished in the following manner (although many other methods may be used). To make an exposed Web service available for consumption, a valid user logs in and is authenticated by the system 100. The system 100 will display a user interface (UI) that allows the user to select the point and consume feature for adding a web service. The user is then permitted to enter the appropriate location of the WSDL document that describes the Web service to be consumed (the user can also upload a WSDL document) and can also provide authentication information (username and password) if required by the exposed Web service. The system 100 retrieves the designated WSDL document and displays the available Web services messages and the parameters available/required.

To utilize the exposed Web service, a valid, authenticated user may use the UI to create a new template. During the creation process, the user identifies a Web service that should be consumed for data/content and/or trigger purposes. If the exposed Web service is designated to be a trigger, criteria/constraints are defined (for example, an exposed Web service might provide the current inventory level for a product). The template might use this Web service as a trigger and if certain criteria are met (e.g., if "product inventory level falls below 100 units"), it will retrieve the number of units that should be on-hand and the cost per unit, by supplier.

The integration engine 300 consumes a Web service by automatically parsing a WSDL document at runtime, determining the current interface, and creating SOAP messages that the Web service can understand. FIGS. 7A-D illustrate one non-limiting embodiment of a WSDL document that can be used by system 100 to define the available Web services. If the Web service changes, the integration engine 300 is adapted to discover the alteration and adjust accordingly.

The integration engine 300 also provides an interface to configure the business rules required to consume the Web service, and for evaluating Web service-based data streams against pre-defined constraints. The integration engine 300 is effective in aggregating multiple Web services from multiple service providers into a unified application.

Figure 3:
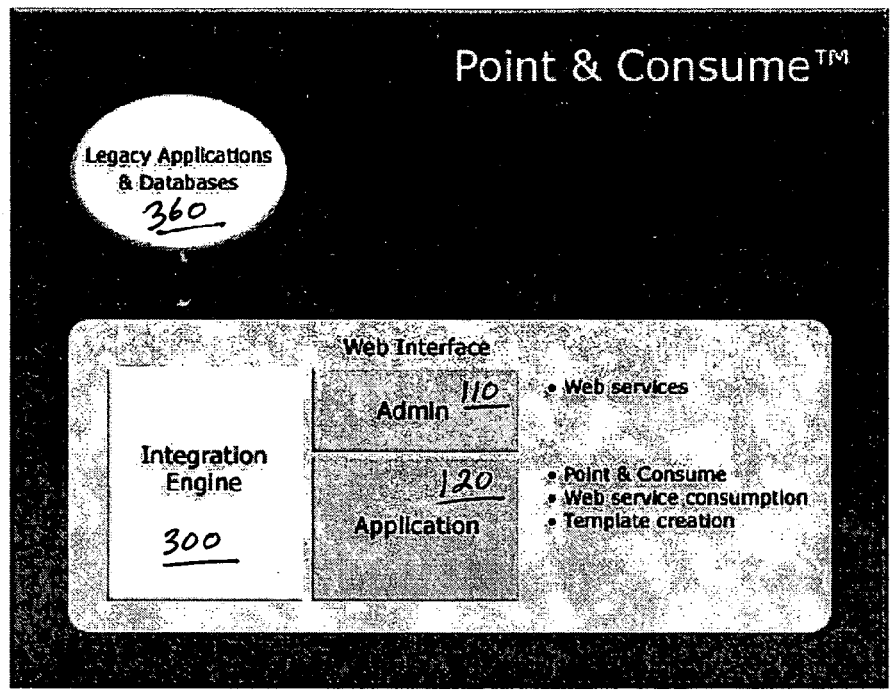
FIG. 3 is a block diagram depicting the integration engine of the system shown in FIG. 1.

The integration engine 300 may provide enhanced support for integrations software such as the J2EE Connector Architecture 1.0, a public specification for integration between application servers and enterprise information systems like ERP, CRM, and legacy applications 360, as shown in FIG. 3. It also supports SOAP, UDDI Discovery Language, WSDL (Web Services Description Language) for Web services, and the use of Web services as an integration function. For those organizations with an already defined set of triggers, the integration engine 300 allows for painless integration into system 100. For those organizations that have not started building triggers yet, the "point and consume" feature provides an excellent, cost-effective alternative. That is, by using point and consume, an enterprise can avoid creating thousands of costly and time-consuming database triggers within proprietary database applications. Instead, point and consume allows them to trigger associations in a modern Web services framework. The operation of the point and consume feature is further discussed below in relation to FIGS. 24A-D.

3. Subscription Manager

Figure 4:
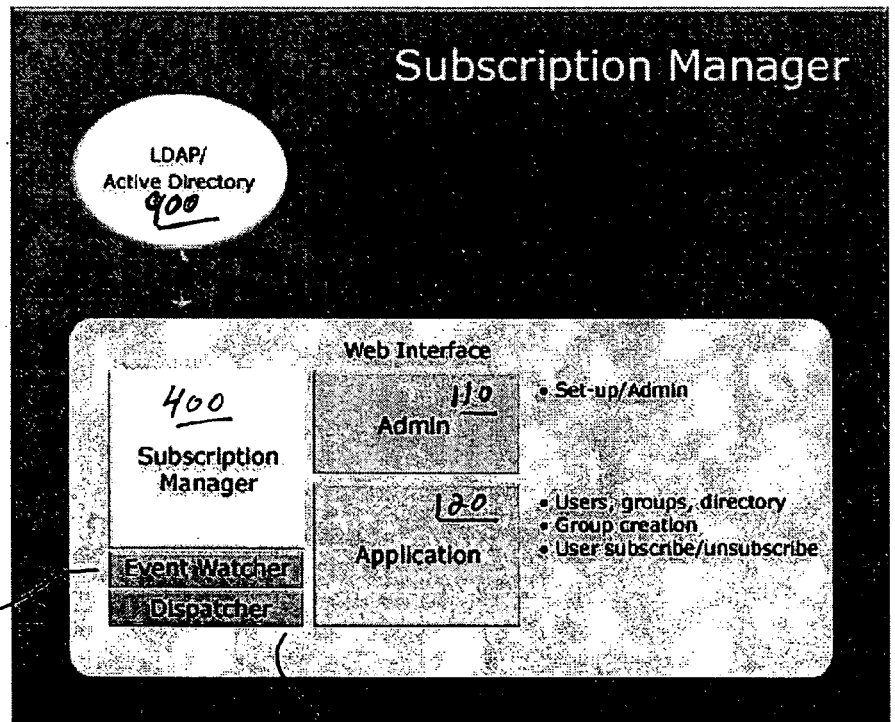
FIG. 4 is a block diagram depicting the subscription manager of the system shown in FIG. 1.

The subscription manager may be communicatively coupled to scheduler 500, the broadcast engine 600 and authentication data stores such as Microsoft's Active Directory 900. FIG. 4 depicts the subscription manager 400. The subscription manager 400 functions in a "publish and subscribe" framework and contains a set of autonomous components, including an event watcher 410 and an event dispatcher 420. The event watcher 410 monitors the state of the external environment it interacts with (such as an ERP or supply chain system) through the integration engine 300. The event dispatcher 420 collects event subscriptions and ensures the instant delivery of events to all subscribers by way of the broadcast engine 600. An example of a published event might be a price increase in a commodity such as coffee, or the quantity of a product (e.g., widgets) falling below a predetermined value.

The event watcher 410 monitors the state of the external environment by utilizing the integration engine 300. For example, the event watcher 410 is informed of external events (such as a consumed Web service) by the integration engine 300. The event dispatcher 420 handles all subscription data (creation, modification, deletion—both transactionally and in batch) and provides the current subscription list when requested. For example, in FIG. 22, the event dispatcher 420 would handle the subscription creation in step 2310 and also provides a list of publication subscribers in the broadcast step 2340.

In addition to supporting one-to-many and many-to-many communication, the primary benefit of the publish and subscribe system is abstracting published events from associated subscriptions, allowing dynamic change through the entire system even if the number of events and subscribers change dramatically.

For example, an author can create a publication that monitors an external data source via the point and consume feature. Over time, subscribers may sign-up for the newly created publication. An event can occur where the criterion for the consumed Web service is met and the associated data is formatted and delivered to the subscribers. The level of abstraction in the "publish and subscribe" system allows the author of the publication to modify the data, data source, format, delivery schedule, and the like without affecting the subscribers. Conversely, the subscribers can individually modify their subscription parameters (e.g., delivery endpoint (e.g., device), delivery method (e.g., IM, email, voice, etc.) and/or status (subscribed/unsubscribed)) without affecting the publication.

Another advantage to the publish and subscribe system is the subscriber opt-in feature. Users can control what publications they subscribe to and can easily unsubscribe if they choose. Thus, users do not need to rely on a company's system administrators to remove them from a distribution list. This feature is useful to safeguard against using system 100 as an IM spamming tool.

The subscription services are available through a Web interface for manual configuration, or via the Web services interface within an existing application. Groups of users ("broadcast groups") can be pulled and authenticated from existing lists in the LDAP/Active Directory 900. Users can also manually subscribe to published events in the system. Status, authentication and history information about broadcast groups and users is also stored by the system 100 and made available. The authentication data store can also be a remote, proprietary system, such as Microsoft Passport™ or the Liberty Alliance™ system. The subscription manager 400 can interact with external/proprietary "subscription systems" such as Microsoft Alerts and the like.

4. Scheduler

Figure 5:
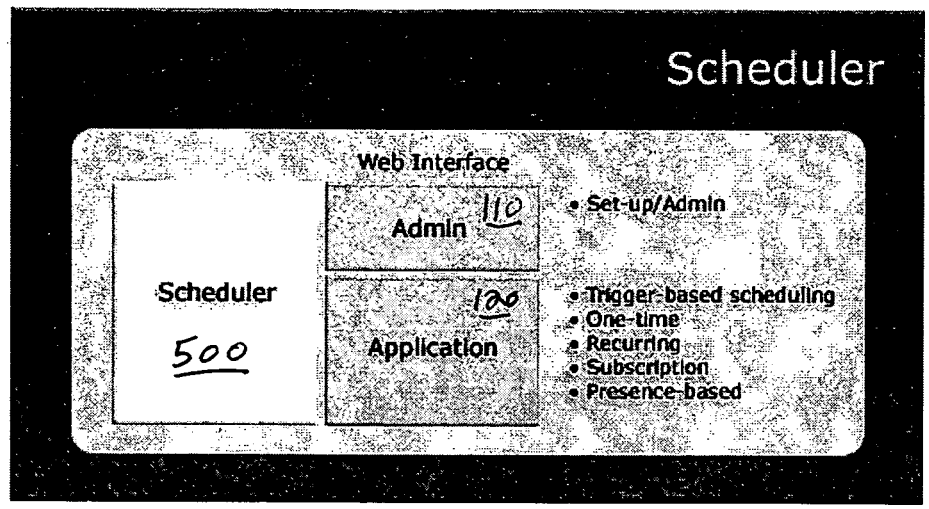
FIG. 5 is a block diagram depicting the scheduling engine of the system shown in FIG. 1.
Figure 6:
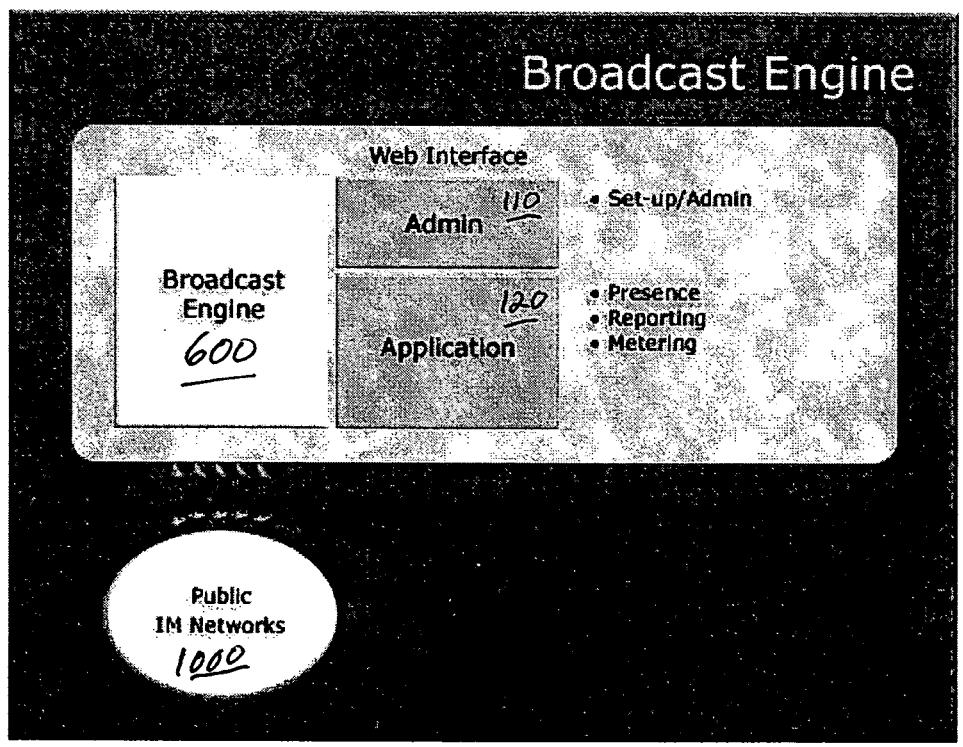
FIG. 6 is a block diagram depicting the broadcast engine of the system shown in FIG. 1.

The scheduling engine or scheduler 500 is communicatively connected to the integration engine 300, the subscription manager 400, and the directory 900. The scheduler 500 is designed to support the sophisticated scheduling requirements of the most complex industries and markets. FIG. 5 depicts the scheduler 500. The scheduler 500 comprises a rules-based application, which allows users to customize the system according to their specifications. The system 100 uses those rules to schedule outgoing messages through the broadcast engine 600.

a) User, Group & Directory Management

The scheduler 500 provides centralized management of users, groups, and a system directory (MC directory). The MC directory may be a proprietary authentication data store, containing data describing users, groups and subscribers. An enterprise that is currently using an authentication data store (LDAP, etc.) can allow the MC Directory "read-only" access, which enables the population of users/groups from existing data (i.e., it does not have to be re-entered, etc.). Specific information is then kept in the MC Directory instead of being written to the enterprise's authentication data store. If an enterprise does not currently utilize an authentication data store, the MC Directory can be the single data source for user authentication/group information.

In the preferred embodiment, the MC Directory can integrate with major directories such as Microsoft's Active Directory (ADSI), LDAP, NetWare NDS, NT/2000 Domains and GroupWise. Users within the MC Directory can be added to broadcast groups—which are defined within the scheduling engine 500. The integration with the Active Directory and LDAP means enterprises can use an existing Active Directory or LDAP data store as a mechanism to build the IM broadcast hierarchy. This is a timesaver for organizations that have already implemented Active Directory or LDAP. Directory integration allows the IM software components of the present invention to function as part of the network rather than operate outside of the network. For organizations that do not want LDAP/AD integration, the scheduling directory may also be used as a standalone application.

The scheduler 500 has powerful filtering capabilities that allow users to quickly define groups of users and selectively target broadcast messages to specified groups.

b) Trigger-Based Scheduling

The system 100 offers trigger-based notifications that automatically send messages on the basis of a particular process, event, date, or by customer specific parameters. Users can define, select and/or set specific business events to automatically trigger notifications and to subscribe users to multiple events. This feature is described in greater below relative to FIGS. 24A-D.

Triggers or unique events, such as a supply chain exception, are configured in conjunction with the Web services' consumption functionality provided by the integration engine 300. A user schedules a message by simply subscribing to a particular Web service, creating the appropriate message, and selecting the group to receive the message.

c) Presence-Based Scheduling

In addition to trigger-based scheduling, the scheduler 500 provides an effective way to schedule the delivery of messages based on presence (whether a user is online and accessible).

By embedding presence information into the scheduler 500, employees can communicate more efficiently, as well as disseminate content and information more effectively. A sender can make scheduling decisions based on a particular user's location or status (e.g., only send a message if a user is present or in a certain location). A retry interval can be specified if a user is offline. Optionally, a message can be stored in an offline queue.

In the preferred embodiment, the scheduler 500 is adapted to provide support for protocols such as SIP (Session Initiation Protocol) as a source of presence, enabling compatibility with enterprise IM products like Lotus Sametime™ and Microsoft™ Live Communications Server. The scheduler 500 may also provide support for the XMPP (Extensible Messaging and Presence Protocol) and thus can receive presence information from Jabber-based messaging systems.

d) One-Time and Recurring Scheduling

The scheduler 500 also allows for one-time and recurring scheduling of notifications and alerts by use of a "message studio" provided by the system 100. The message studio allows a valid, authenticated author to create a publication via an easy to use GUI. The author can define the content, format, data sources (whether they are consumable Web services or external applications/databases), subscription groups, and the schedule and event trigger type used by the scheduler 500.

Once a message has been created in the message studio, it can be recalled from within the scheduler 500 for broadcast configuration. Messages can be scheduled for periodic delivery and run indefinitely or continue until a frequency or end-date is reached. Users can schedule a broadcast for any time in the future as well as control broadcast priority ordering.

e) Subscription Scheduling

A superset of scheduling activity is subscription-based alerting. Subscription alerts can be set up using the scheduler, and may have some kind of group or community aspect to them. Notifications are scheduled by rules that can encompass any or all of the above scheduling mechanisms.

Subscription scheduling may be integrated with alerting efforts such as Microsoft's .NET Alerts™ program. The system 100 provides both a cost-effect integration layer and application layer in driving these types of alerting schemes.

5. Broadcast Engine

The broadcast engine 600 may be communicatively coupled to the integration engine 300, the subscription manager 400, and the public and/or private networks 1000 serviced by system 100. In the preferred embodiment, the broadcast engine 600 is a high-volume broadcast engine, which supports message delivery to the following: 1) Major IM networks, such as AOL™, MSN™, Yahoo!™, other SIP/SIMPLE-based networks; 2) Enterprise IM (EIM), such as Microsoft™ Live Communications Server, Lotus Sametime™, Microsoft™ Exchange 2000 IM, Jabber (XMPP), other SIP/SIMPLE-based applications; and 3) Alert solutions, such as Microsoft™ .Net Alerts, AOL™ Alerts, Yahoo!™ Alerts, and the like.

One of the challenges in building an IM-based broadcasting application is that IM is not a broadcast medium. IM networks were built for person-to-person (one-to-one) communication. As such, IM is inadequate for corporations that need to automate communication, whether it is sending a message to a single person or thousands of simultaneous employees or customers ("one-to-massively-many activities").

The broadcast engine 600 enhances these inherent limitations by providing a multi-threaded broadcasting engine capable of sending volumes of messages from one server to literally thousands of IM clients concurrently over different private and public networks.

The broadcast engine 600 receives requests from the messaging manager 200 and routes the messages appropriately. Users do not need to worry about which public or private network the receiver uses—the broadcast engine 600 handles delivery in a seamless manner.

a) Metering and Reporting

In the preferred embodiment, the broadcast engine 600 includes a metering and reporting functionality. Particularly, the broadcast engine 600 meters broadcasted messages sent and received, tracking them on the different IM networks.

The events for a broadcast (created, queued, delivered, etc.) are maintained at a transactional level in a data warehouse, as are other specific pieces of data such as the delivery mechanism (IM, email, etc.) and the network utilized (AOL, etc). Metering and reporting can be accomplished by mining the data warehouse. An example of this might be the following:

An author creates a publication and assigns a subscription group.

Subscribers sign-up for the publication, which is delivered on a weekly (scheduled basis).

The publication runs over the period of a calendar month.

The broadcast engine 600 populates the data warehouse with information transactionally, so each individual message that was sent/attempted to be sent has been noted.

A report can then be created via the GUI or exposed MessageCast Web service that details the number of successful/unsuccessful messages sent by network.

This information can be provided in the aggregate or at the lowest level of detail. In one embodiment, the reporting functionality can also extract metering data and delivers robust Web-based reporting that can be emailed and/or downloaded into an application, such as Excel.

b) Tracking Click-Thru's

The broadcast engine 600 further offers "full click-thru tracking" and reporting on broadcasts that contain a URL. That is, when a message is delivered via IM to an end-user, the message may contain "linkage" information (i.e., HTML that is "hot"). If the user clicks on the message (for example, a message might say "Acme Corp beats sales targets"), the user's web browser cane be directed to a website that displays more information about the message (Acme Corp's press release about their recent quarter, for example). The "click-through" data is captured and stored in a data warehouse and can be used to provide reporting and other information. The mechanism to capture the click-through is accomplished by directing the user's web browser to a proprietary system application and then transparently redirecting the user to the target defined in the publication.

As should be appreciated by one of ordinary skill in the art, the above-described system provides an improved platform for broadcasting instant messages. The system 100 expands IM from a simple one-to-one communications mechanism into a one-to-many and many-to-many platform that is highly scalable and accessible by a wide variety of knowledge workers.

The present invention has been designed from the ground up to be a highly scalable, tightly integrated, transactional environment that does not require a programming background to operate.

These advantages, along with the operation and user interface of the system, are further demonstrated in relation to the operation of the system, which is described below.

II. Operation of System 100

Figure 22:
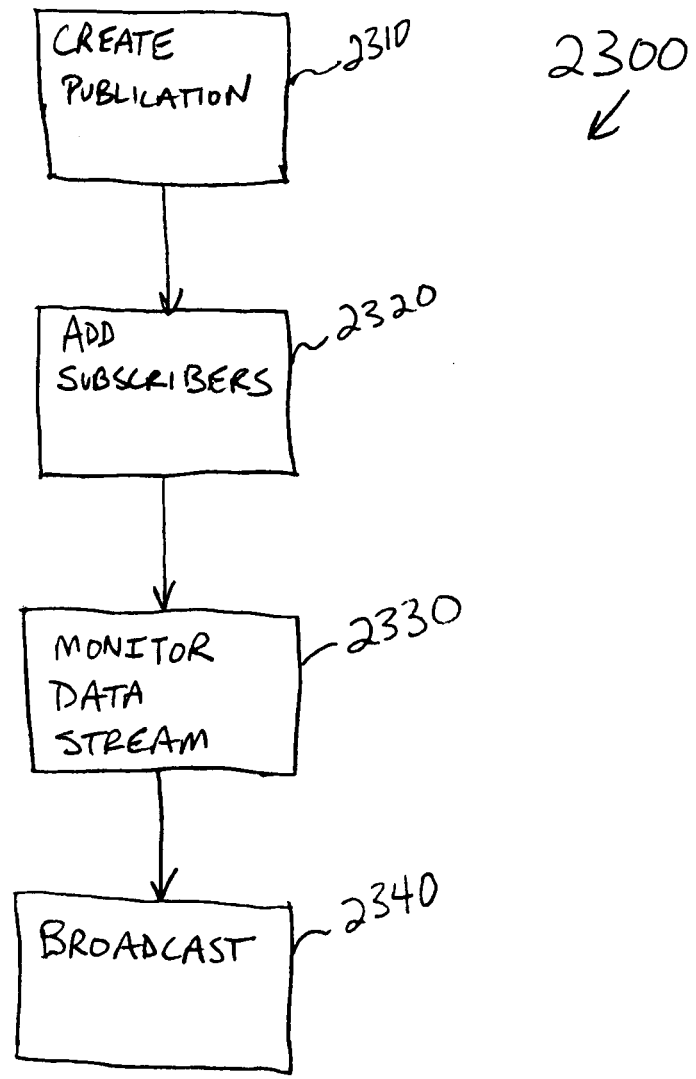
FIG. 22 is a flow diagram illustrating the general process used by the system to broadcast data.

This section provides examples of the operation of the system 100, namely, the operation of messaging manager 200 and its interaction with the other components of system 100. FIG. 22 is a flow diagram 2300 illustrating the general process used by messaging manager 200 and other components of system 100 to broadcast data. Generally, the system 100 may be used to automatically broadcast data through four basic steps.

First, in step 2310, the messaging manager 200 is used to create a publication that defines data or messages to be broadcast based upon a predetermined schedule or triggering events. In step 2320, subscribers are added to the publication. In step 2330, one or more data streams are monitored to determine when a broadcast of data should be made. Finally, in step 2340, the broadcast engine broadcasts data to the subscribers.

Figure 23A:
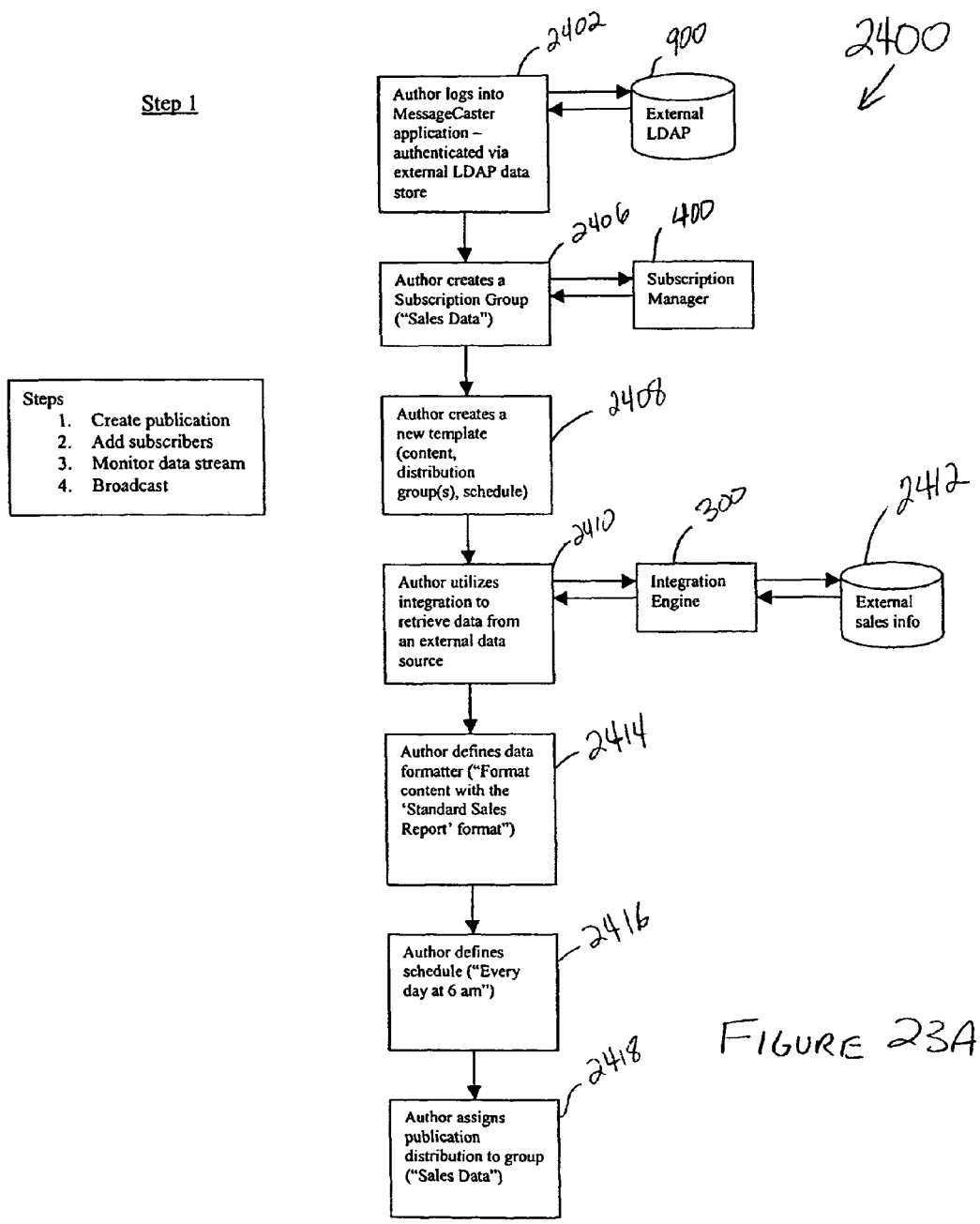
FIGS. 23A-D illustrate the detailed operation of each of the steps shown in FIG. 22, relative to a publication for retrieving and broadcasting external sales data on a fixed scheduled basis.

FIGS. 23A-D illustrate the detailed operation of each of the foregoing steps relative to a publication for retrieving and broadcasting external sales data on a fixed scheduled basis. FIG. 23A is a flow diagram 2400 illustrating the first "publication creation" step of the process. This step begins when an author logs into the system or messaging manager 200, and is authenticated by use of external LDAP 900, as shown in functional block 2402. Next, the author creates a subscription group for receiving the sales data by use of subscription manager 400, as shown in functional block 2406. The author can create a new template for the subscription group by providing information such as content, distribution, group and schedule information, as shown in functional block 2408. The author then utilizes the integration engine 300 to retrieve data from an external data source, e.g., the external sales data source 2412, as shown in functional block 2410. The author defines how the system 100 will format the broadcast data (e.g., in "standard sales report format") in functional block 2414, and defines the broadcast schedule (e.g., "every day at 6 a.m.") in functional block 2416. Lastly, in functional block 2418, the author assigns the publication distribution to the created group.

Figure 23B:
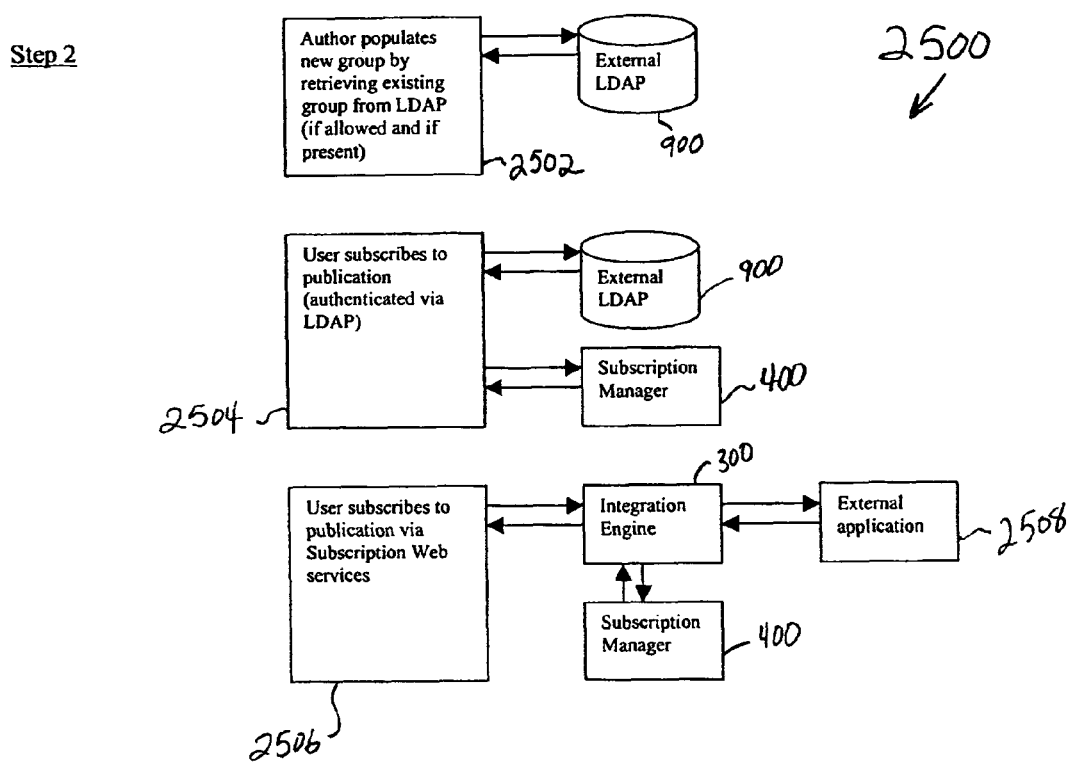

FIG. 23B is a diagram 2500 illustrating the "adding subscribers" step of the process relative to a publication for retrieving and broadcasting external sales data on a fixed scheduled basis. In the present embodiment, there are three ways subscribers can be added. The author of the publication can populate the new group by using an existing group retrieved from the LDAP 900, as shown in functional block 2502. Individual users can also subscribe to the publication using the subscription manager 400, as shown in functional block 2504. The individual users may be authenticated through LDAP 900. Individual users may also be subscribed through the use of a subscription Web service, as shown in functional block 2506. Particularly, an external application 2508 can request the subscription Web service through the integration engine 300. The integration engine 300 will receive the subscription data entered by a user and provide it to subscription manager 400.

Figure 23C:
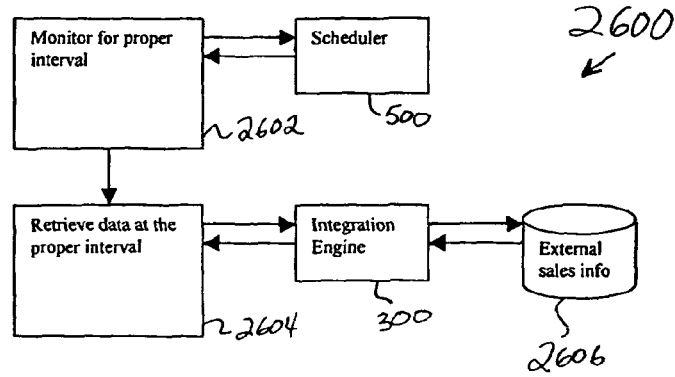

FIG. 23C is a diagram 2600 illustrating the monitoring step of the process relative to a publication for retrieving and broadcasting external sales data on a fixed scheduled basis. In functional block 2602, the messaging manager 200 monitors for the proper time interval set by the author by use of scheduler 500. At the appropriate time interval, the messaging manager 200 retrieves the data from the external source 2606 by use of the integration engine 300, as shown in functional block 2604.

Figure 23D:
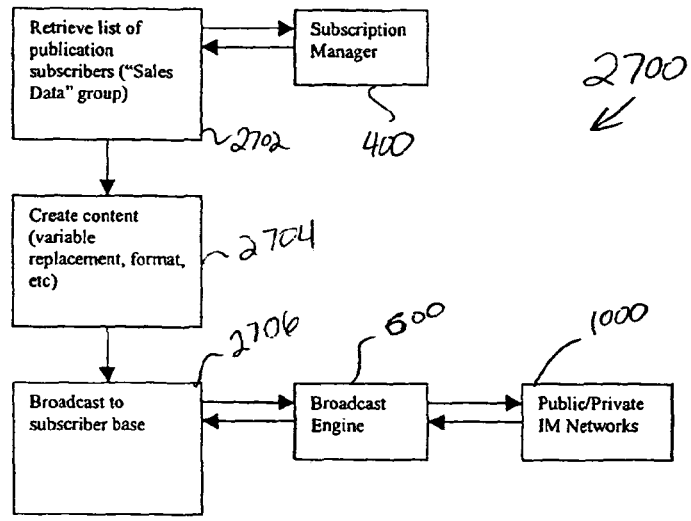

FIG. 23D is a diagram 2700 illustrating the broadcast step of the process relative to a publication for retrieving and broadcasting external sales data on a fixed scheduled basis. In functional block 2702, the messaging manager 200 retrieves a list of subscribers to the publication through the subscription manager 400. In functional block 2704, the messaging manager 200 creates and formats the content to be broadcast according to the data retrieved in the previous step and the formatting requirements set by the author. In functional block 2706, the system 100 transmits the data to each of the subscribers through the respective public and private IM networks 1000 by way of broadcast engine 600.

Figure 24A:
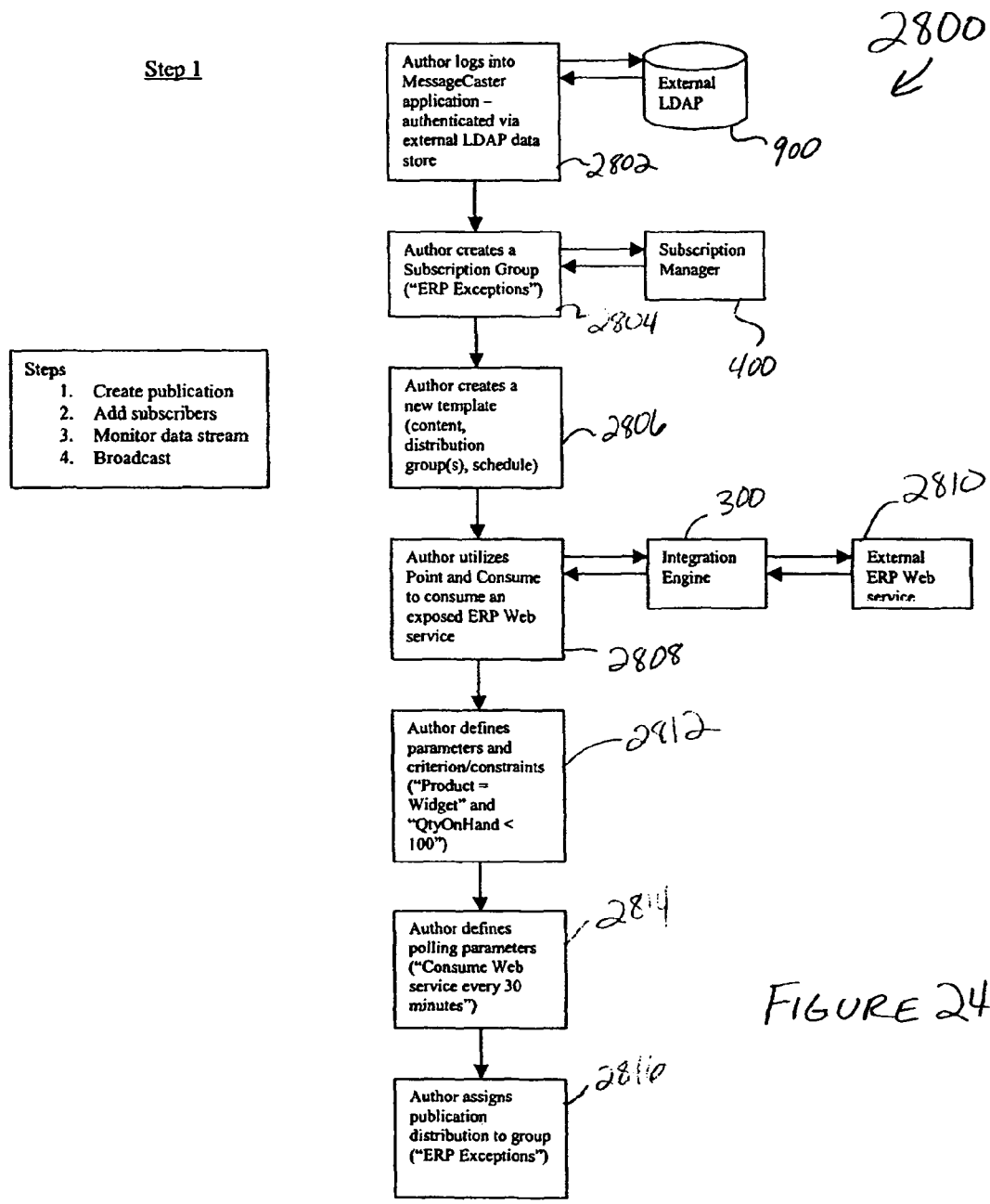
FIGS. 24A-D illustrate the detailed operation of each of the steps shown in FIG. 22, relative to a publication that utilizes a consumed ERP Web service, which monitors an ERP system to detect a certain condition.

FIGS. 24A-D illustrate the detailed operation of the each of the steps shown in FIG. 22 relative to a publication that utilizes a consumed ERP Web service, which monitors an ERP system to detect a certain condition (e.g., when the quantity of a certain product falls below a certain level). FIG. 24A is a flow diagram 2800 illustrating the first step of the process. This step begins when an author logs into the system or messaging manager 200, and is authenticated by use of external LDAP 900, as shown in functional block 2802. Next, the author creates a subscription group for receiving the ERP data by use of subscription manager 400, as shown in functional block 2804. The author creates a new template for the subscription group by providing information such as content, distribution, group and schedule information, as shown in functional block 2806. The author then utilizes the point and consume feature within the integration engine 300 to consume an external Web service, e.g., the external ERP Web service 2810, as shown in functional block 2808. The author defines the parameters that will trigger a broadcast (e.g., when the quantity of widgets falls below 100) in functional block 2812, and defines how often the Web service will be consumed and polled or the "polling parameters" (e.g., once every 30 minutes) in functional block 2814. Lastly, in functional block 2816, the author assigns the publication distribution to the group.

Figure 24B:
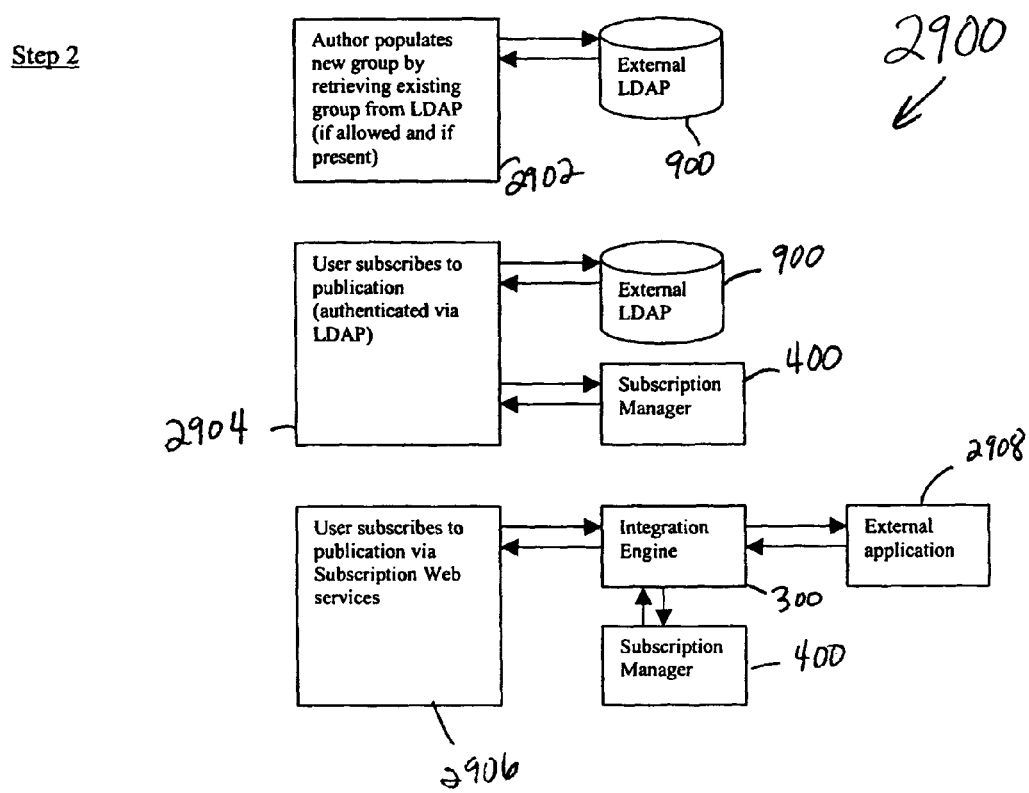

FIG. 24B is a diagram 2900 illustrating the adding subscribers step of the process. In the present embodiment, there are three ways subscribers can be added. The author of the publication can populate the new group by using an existing group retrieved from the LDAP 900, as shown in functional block 2902. Individual users can also subscribe to the publication using the subscription manager 400, as shown in functional block 2904. The individual users are authenticated through LDAP 900. Individual users may also be subscribed through the use of a subscription Web service, as shown in functional block 2906. Particularly, an external application 2908 can request the subscription Web service through the integration engine 300. The integration engine 300 will receive the subscription data entered by a user and provide it to subscription manager 400.

Figure 24C:
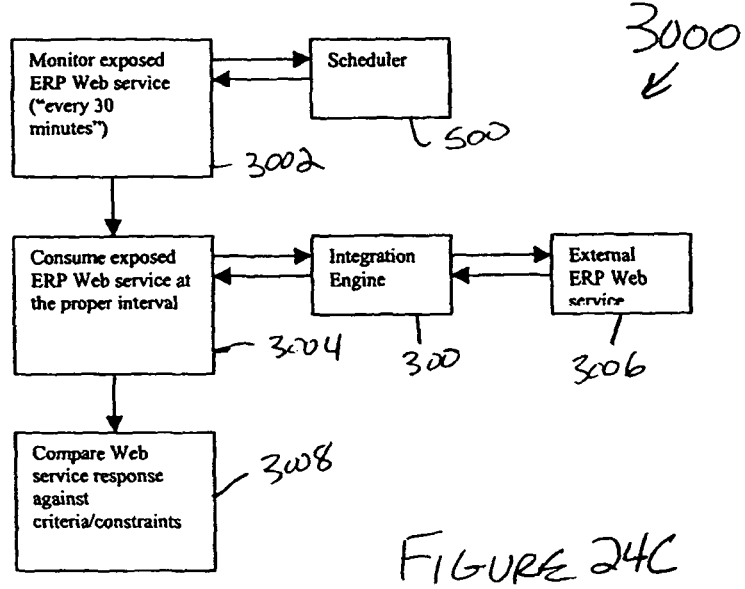

FIG. 24C is a diagram 3000 illustrating the monitoring step of the process. In functional block 3002, the messaging manager 200 monitors the exposed Web service once during each time interval set by the author by use of scheduler 500. At the appropriate time interval, the system 100 consumes the ERP Web service 3006 by use of the integration engine 300 in order to receive the requested data, as shown in functional block 3004. The messaging manager 200 then compares the response data to the predetermined criteria set by the author (e.g., whether the quantity of widgets is <100), as shown in functional block 3008.

Figure 24D:
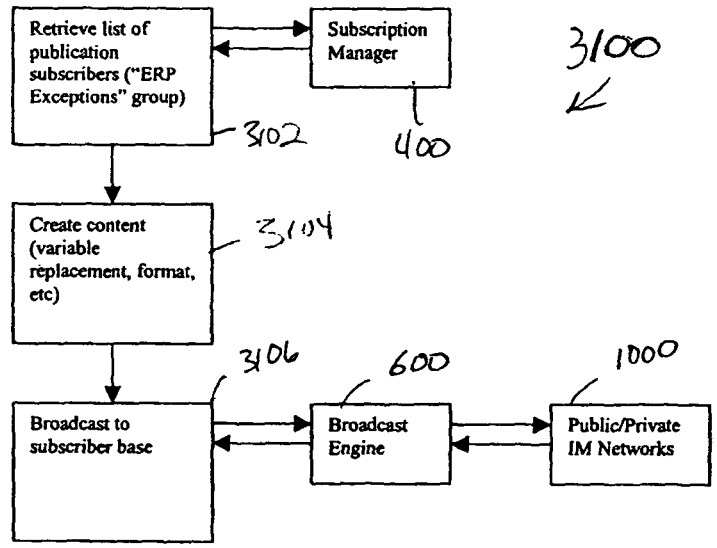

FIG. 24D is a diagram 3100 illustrating the broadcast step of the process. In functional block 3102, the system 100 retrieves a list of subscribers to the publication through the subscription manager 400. In functional block 3104, the messaging manager 200 creates and formats the content to be broadcast according to the data retrieved in the previous step and the formatting requirements set by the author. In functional block 3106, the system 100 transmits the data to each of the subscribers through the respective public and private IM networks 1000 by way of broadcast engine 600.

III. Example of an Implementation of System 100

In operation, system 100 may provide an improved, multi-threaded and highly scalable environment for broadcasting data over a computer network. The following non-limiting example demonstrates, inter alia, a user's experience with the system 100 in an embodiment where the system is used to implement Microsoft™ .NET alerts. It should be appreciated that the following non-limiting example in no way limits the scope of system 100 and that system 100 may be used to implement virtually any other type of messaging application.

1. Initial Signup Procedure

Figure 25:
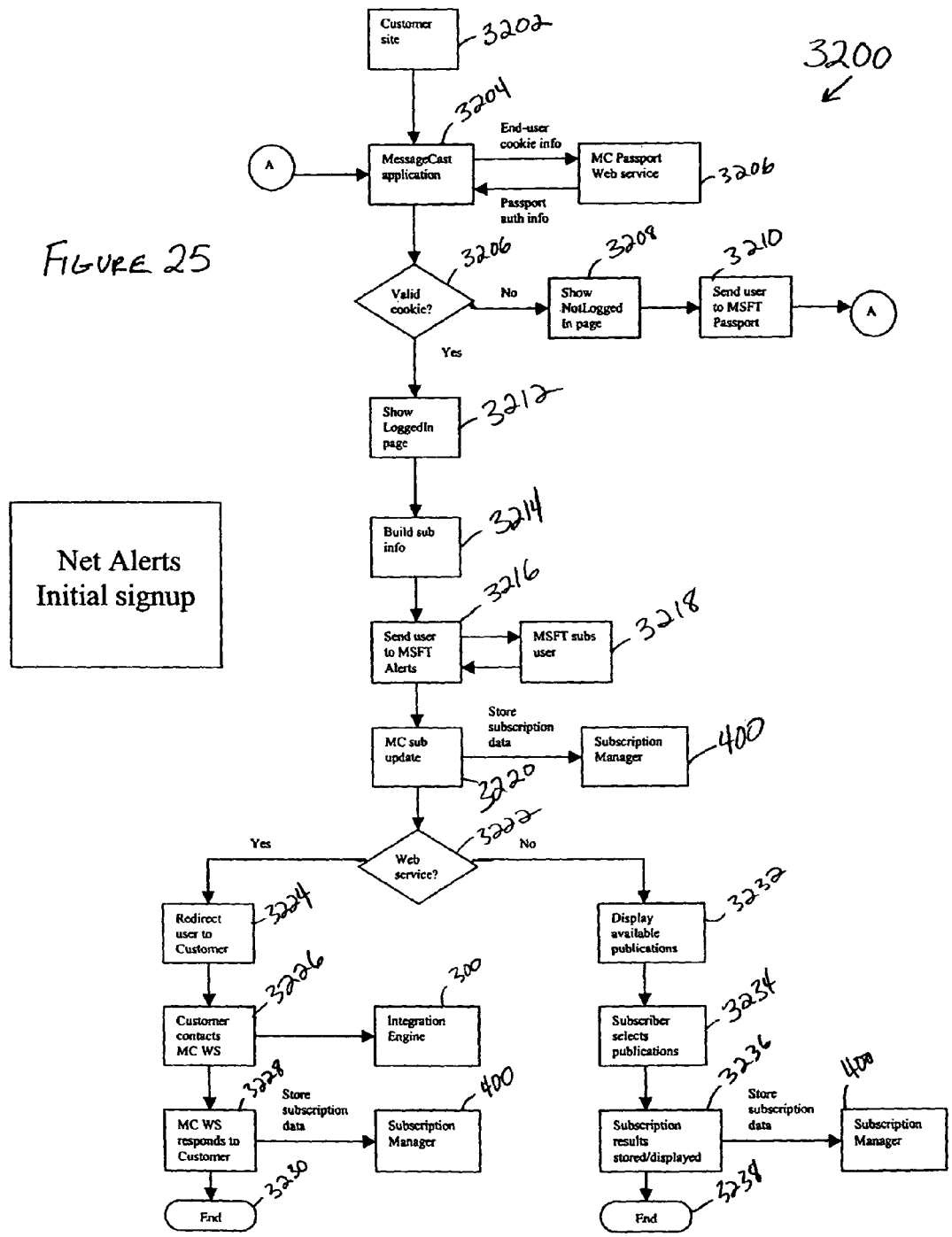
FIG. 25 is a flow chart illustrating the initial signup procedure that allows a user to sign up for the .Net Alerts service implemented by the system.

FIG. 25 is a flow chart illustrating the initial signup procedure 3200 that allows a user to sign up to the Alerts system. An end-user begins the procedure by pointing his/her web browser to a customer website (step 3202), and while browsing this site, selects a link (for example, a link that says "Click here to subscribe"). The user's browser is then routed over HTTP/HTTPS to a Web site for system 100 (step 3204). The browser is queried for cookie information, which is passed via a system Web service 3206 to a Microsoft Passport server. The Web service 3206 responds with authorization information for the user's Passport ID. The system then determines if the authorization is valid (step 3206). If the authorization is deemed to not be valid, the user is redirected to a screen in their browser that displays a "NotLoggedIn" page (for example, a screen that says "You have not logged into Passport, please click here") in step 3208. The user is then redirected to a Microsoft Passport login screen (step 3210), and upon doing this, is redirected to the system application (step 3204). If the user has been successfully authenticated, their browser is redirected to a "LoggedIn" page (for example, a page that says "Welcome to the Acme Subscription Manager") in step 3212.

Subscription information is then built in step 3214 and the user's browser, along with the subscription information is redirected to Microsoft Alerts in step 3216. Microsoft then validates the subscription information and subscribes the user in step 3218. The user's browser is then redirected back to the system application (step 3220), where the subscription manager 3200 stores the subscription data.

In step 3222, if the partner/originating website is configured to communicate with the system application via Web services, the user's browser is then redirected back to the originating site (step 3224). The originating website then subscribes the user to a specific group/groups (step 3226) through the use of the integration engine 300. In step 3228, the Web service responds to the request and if the request is valid, the subscription information is stored via the subscription manager 400. The subscription process then ends in step 3230.

If the Partner/originating website is not configured to communicate with the system application via Web services (i.e., the system is managing the subscription process for the Partner), the user's browser is redirected to a screen displaying a list of available publications (step 3232). The user selects publications to subscribe to and presses the submit button (step 3234). The system application then displays the results of the subscription process (step 3236) and stores the subscription information via the subscription manager 400. The subscription process then ends in step 3238.

2. User Interaction and Interfaces

Various user interfaces that may be generated during operation of the system 100 are described below.

Login

FIG. 8 illustrates an example of a Login Screen 1100 that may be generated by system 100 to allow users to log into the system. For security purposes, each user of the system will have a unique login identification. In the preferred embodiment, different permission levels can be set giving different classes of users varied access to the application.

To login to the system 100, users will simply go to a particular URL address and enter their respective PIN ID, Log In Name, and Password and select the "Log In" button.

Setup

FIG. 9 illustrates an example of an initial set up screen 1200. To setup the alert platform, a user will simply fill in the fields shown in screen 1200. A user may then upload graphics and select the "Submit" button. Fields may include: (i) a "Company name" field (the company name will appear on the sign up screens where appropriate); (ii) "Site ID", "Password", and "Confirm Password"—the system may provide the site ID and passwords; (iii) "Error page" (the URL for to fallback to if a facility is temporarily non-operational); (iv) "Default Action URL" (the URL where customer is redirected, when they click the alert text, to get more information); and (v) "Subscription URL" (the URL that sends the user to the appropriate website screen to modify what publications they are subscribed).

FIG. 10 illustrates an example of a setup screen 1300 for uploading graphics. As shown, the user can upload and/or create an icon that appears in the alert to let recipients know where the alert came from. The screen provides a link to an image editor, create a new image and specify a size of the image, e.g., 32×32 pixels. For the background, the user can specify transparent (alpha method) or a color. The user can also specify the color depth, e.g., 24-bit. The interface screen 1300 also allows the user to upload the logo icon image in a selectable file type, e.g., .png file The user can use screen 1300 to further upload and/or create a header graphic that will appear at the top of the user signup pages. The user can use the image editor to create a new image and specify a size (e.g., within 720×70 pixels). For the background, the user can specify it as color or transparent, and similarly can specify a color depth (e.g., 24-bit). The interface allows the user to upload a graphic in a variety of formats, including GIF and JPEG.

The foregoing interfaces allow gathering information to be simple and straightforward. Without these simple to use interfaces, it could take a considerable amount of time to assemble and implement all of the information.

Subscription

System 100 provides a platform that is able to reach a large, targeted group of subscribing individuals effortlessly. Particularly, the "Create Groups" feature provided by the subscription manager 400 allow a user to create, manage, and link large or small groups of subscribers together. FIGS. 11 and 12 illustrate two screens 1400 and 1500, respectively, for creating subscription groups.

Screen 1400 lists all of the subscription groups. To modify a group, a user can select the "Modify" link. To delete a group, a user can select the appropriate checkbox and select the delete link. To create a new group, a user can select the "Create Group" button, which will cause the system 100 to display screen 1500. Screen 1500 allows a user to create and manage subscriber groups without any programming. To create a new group, a user simply types the group name, adds subscribers, and selects the "Submit" button.

Subscription/Signup

Figures 13, 14:
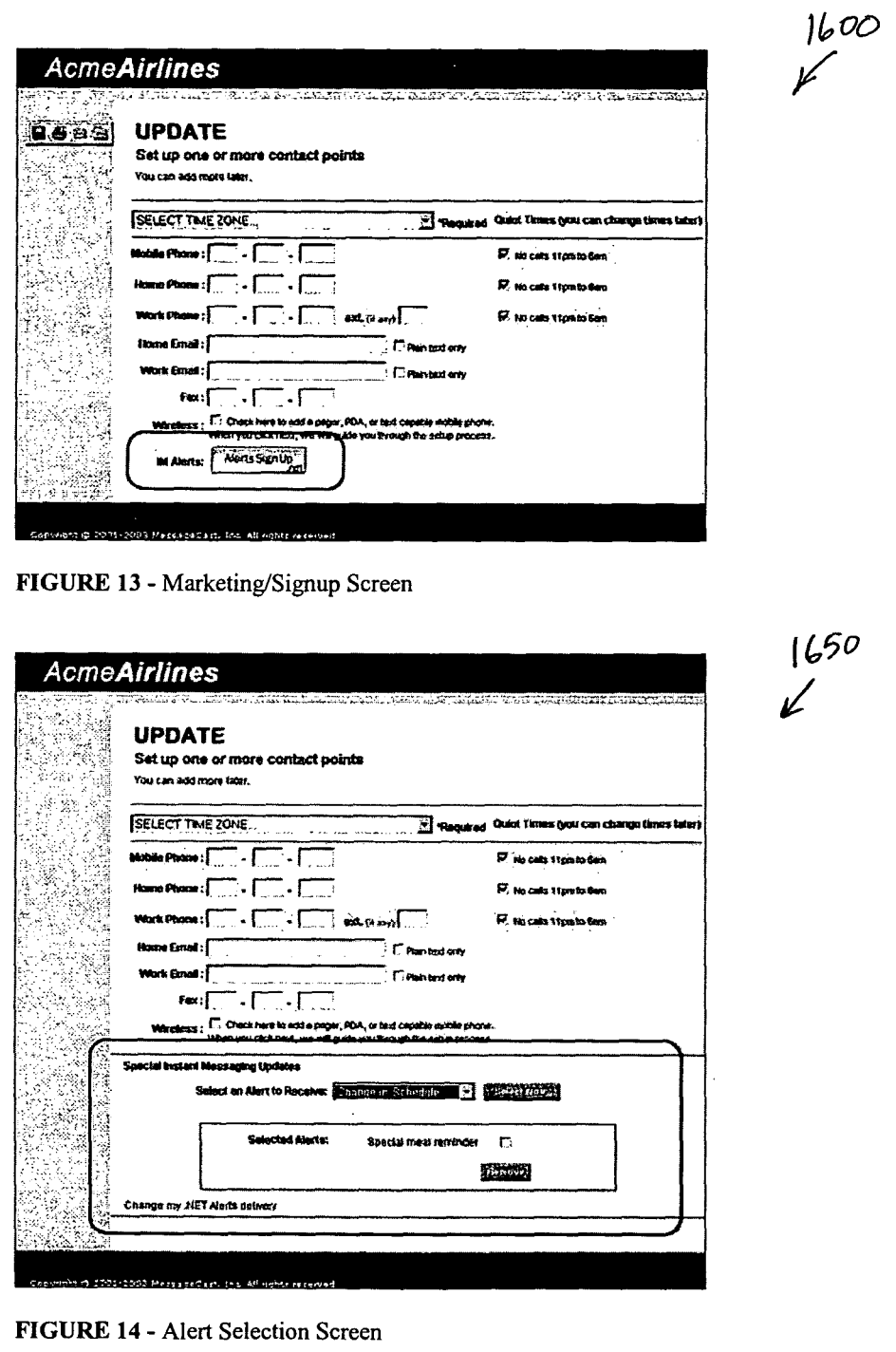

FIG. 13 is one example of a marketing signup screen 1600 that must be completed before a customer can receive informational alerts. With system 100, customers are in control of the sign up process, eliminating any unwanted messages (i.e., spam). The customer can initiate the process by selecting the "Alerts Signup" button.

FIG. 14 is an example of a screen 1650 that allows users to select a category of alerts they would like to receive by way of a pull-down menu. By pressing the "Select Now" button, the user will select the alert highlighted in the menu.

Figure 16:
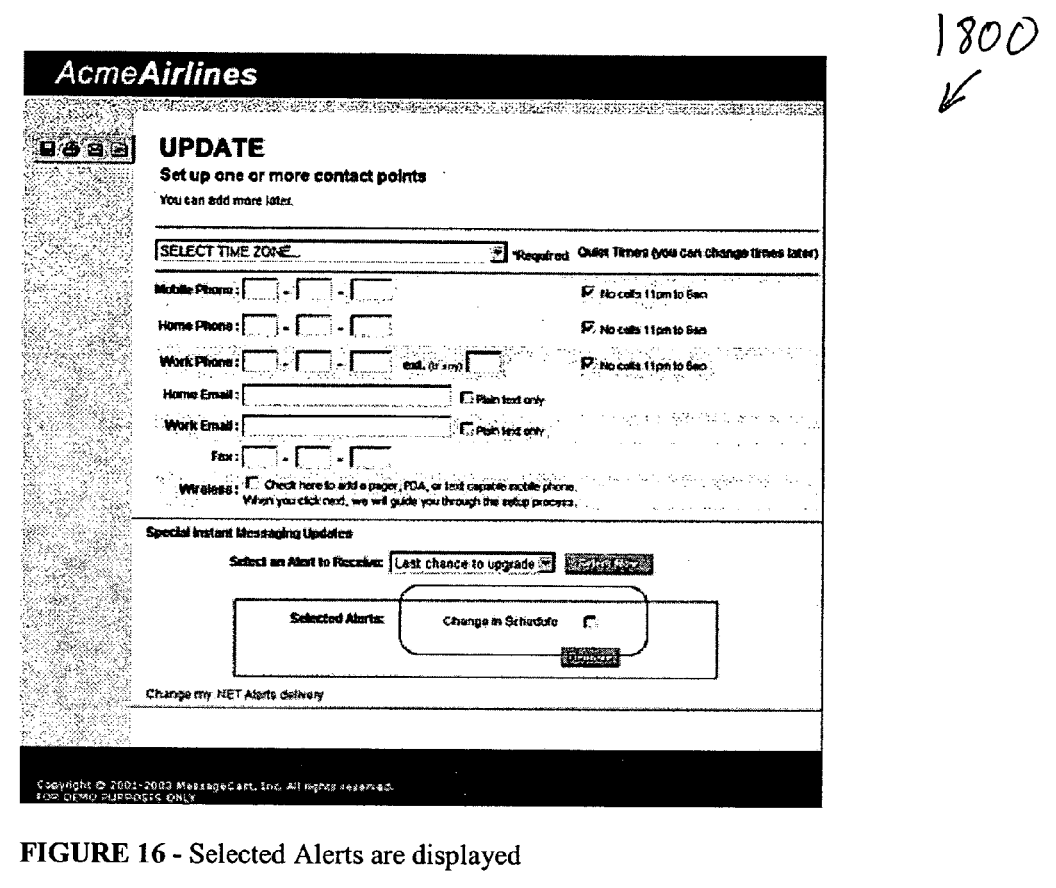

FIG. 15 is an example of a screen 1700 that allows a user to select a device to which the alerts will be sent. In the present .Net Alerts embodiment, the user system 100 is not just limited to Instant Messaging. A user can also choose to receive alert information via email or by cell and set the delivery order of each mechanism. FIG. 16 is an example of a screen 1800 displaying the alerts that have been selected by the customer.

In the present embodiment, there are two kinds of alerts—triggered and editorial. A triggered alert responds to an incoming piece of information. One example may be, "Please notify me when Barry Bonds hits another homerun." An editorial alert, on the other hand, allows a customer to send a piece of information. One example may be, "Don't forget about the big sales meeting tomorrow at 8 a.m."

FIGS. 17-19 are examples of screens 1900, 2000 and 2100 used to create and send editorial alerts. These alerts are described above relative to FIGS. 23A-D. There are three steps to creating an editorial alert: (1) Create message; (2) Choose which group to send that message to; and (3) Schedule delivery. Screen 1900 allows a user to create the message by entering the text of the message into the corresponding field. Screen 2000 allows a user to choose a group that will receive the message. The group may be selected from the "Group Name" pull-down menu. Screen 2100 allows a user to select the schedule for message delivery (e.g., once per week, day, hour, etc.).

Triggered alerts are messages that are triggered by a predetermined condition selectable by the user. These alerts are described above relative to FIGS. 24A-D. FIG. 20 illustrates an example of a SOAP message that could be used to send triggered alerts. Those skilled in the art will appreciate how to create SOAP messages based on the type of trigger alert that is desired.

FIG. 21 is an example of an alert 2200 that may be sent by system 100. A user will receive the alert 2200 on the selected device. The icon graphic (e.g., AA) is the graphic that was uploaded in the graphics setup screen 1300.

Those skilled in the art will recognize that the foregoing exemplary embodiments described above provide only a few of many systems and methods that can be implemented according to the present invention. Various changes, substitutions, and alternations can be made herein without departing from the principles and the scope of the present invention.

What is claimed is:

1. A method comprising:
providing an interface for an author to create a publication;
providing an interface to add subscribers to the publication;
providing an interface to set a schedule for delivering the publication to the subscribers, wherein the subscribers are from a plurality of disparate networks and are described by data within a centrally managed directory, and wherein the schedule for delivering the publication is determined based at least in part on:
a parameter for determining an online presence of one or more of the subscribers described by the centrally managed directory; and
consuming, according to a predetermined schedule, a Web service to receive a data stream upon which the publication is based, wherein the Web service is identified via the interface for the author to create the publication by:
indicating a location of a document that describes the Web service; and
providing required authentication information of the author to consume the Web service; and
delivering the publication across the plurality of disparate networks to the one or more of the subscribers based at least in part on the data stream and the respective online presence of the one or more of the subscribers.

2. The method of claim 1, wherein the publication is delivered in the form of Instant Messages.

3. The method of claim 1, wherein the interface for the author to create the publication allows the author to create the publication by:
creating a subscription group defining the subscribers;
defining a format in which data will be received by the subscribers, wherein the format comprises a delivery mechanism selected from the group consisting of Instant Message, email, and voice; and
defining the predetermined schedule for consuming the Web service.

4. The method of claim 1, further comprising:
comparing the data stream to one or more parameters for triggering a broadcast; and wherein data is broadcast to the subscribers only if at least one of the one or more parameters have been met.

5. The method of claim 4, wherein the interface for the author to create the publication allows the author to create the publication by:
   creating a subscription group defining the subscribers;
   defining a format in which data will be received by the subscribers;
   defining the predetermined schedule for consuming the Web service; and
   defining the one or more parameters for triggering the broadcast.

6. The method of claim 1, wherein providing the interface to add the subscribers to the publication includes providing an interface for users to individually subscribe to and unsubscribe from the publication.

7. The method of claim 6, wherein the interface to add the subscribers allows the users to individually subscribe to and unsubscribe from the publication via a subscription Web service.

8. The method of claim 7, wherein the interface to add the subscribers further allows the users to individually modify subscription parameters including delivery endpoint and delivery method, and user modifiable delivery methods comprise Instant Messaging, email, and voice.

9. The method of claim 6, further comprising authenticating the users by integrating with one or more third party authentication services.

10. The method of claim 9, wherein the one or more third party authentication services comprises at least one proprietary authentication system.

11. The method of claim 1, wherein providing the interface to add the subscribers to the publication includes providing an interface for the author to add users to the publication.

12. The method of claim 1, further comprising integrating with one or more third party subscription management services to subscribe users.

13. The method of claim 12, wherein the one or more third party subscription management services comprises at least one proprietary subscription management service.

14. One or more storage devices having computer-executable instructions stored thereon that, when executed, direct one or more computers to send data over a computer network via operations comprising:
   generating a subscription interface useable by a plurality of users connected via disparate networks to subscribe to a publication;
   generating a plurality of interfaces usable by an author to create and schedule sending of the publication over the disparate networks to the plurality of users, the plurality of interfaces comprising:
      a publication creation interface useable by the author to create the publication; and
      a scheduler interface through which the author can create a publication schedule for the publication by:
         consuming an existing Web service to use as a trigger for sending the publication to the plurality of users, wherein the existing Web service is consumed by providing a location of a document that describes the existing Web service, the document comprising a Web Services Description Language (WSDL) document;
         providing authentication information that permits use of the existing Web service; and
         defining criterion that, when obtained by monitoring the existing Web service, triggers sending the publication;
   monitoring the existing Web service for the criterion; and
   sending the publication to one or more of the plurality of users when a parameter indicates the respective one or more of the plurality of users are online.

15. One or storage devices as recited in claim 14, wherein the publication is sent via an Instant Message.

16. One or storage devices as recited in claim 15, wherein the publication is sent in a user-defined Instant Message format.

17. One or storage devices as recited in claim 14, wherein the criterion comprises a configurable time having past since a previous sending of the publication.

18. One or storage devices as recited in claim 14, wherein the plurality of interfaces guide creating the publication via actions comprising:
   creating a subscription group defining the plurality of users authorized to subscribe to the publication;
   defining a format in which the publication will be received by the plurality of users, wherein the format comprises one selected from the group consisting of Instant Message, email, and voice; and
   defining a schedule for consuming the existing Web service.

19. A method comprising:
   providing a first Web Service enabling delivery of a message to a plurality of disparate messaging clients across a plurality of disparate networks;
   providing a Web-based self-managing publish/subscribe mechanism for an author to create a publication and a user to subscribe to the publication;
   enabling a point and consume interface, the point and consume interface enabling retrieval of a web services description language (WSDL) document describing a second Web service, and the point and consume interface offering a consumable data stream as one or more of content or a trigger mechanism for the publication;
   determining a schedule for delivering the publication to subscribed users based at least on consuming the data stream;
   integrating the first Web service with at least one system comprising:
      remote authentication systems including one or more proprietary authentication systems;
      third party subscription management systems including one or more proprietary subscription management systems; or
      enterprise instant message (EIM) products including one or more proprietary EIM products;
   integrating the first Web service with a plurality of protocols including one or more of session initiation protocol (SIP) or extensible messaging and presence protocol (XMPP);
   delivering, via the first Web service and across the plurality of disparate networks to the plurality of disparate messaging clients, an Instant Message associated with the publication to the user subscribed.

20. A method as recited in claim 19, wherein the first Web service is configured such that individual subscribed users select a publication delivery method, wherein the publication delivery method comprises at least one of Instant Messaging, email, and voice.

21. A method as recited in claim 19, wherein the first Web service is configured such that the author selects a publication delivery mechanism, wherein the publication delivery mechanism comprises at least one of Instant Messaging, email, and voice.

* * * * *